(12) United States Patent
Decker et al.

(10) Patent No.: US 6,570,615 B1
(45) Date of Patent: May 27, 2003

(54) PIXEL READOUT SCHEME FOR IMAGE SENSORS

(75) Inventors: Steven Decker, Derry, NH (US); Stuart Boyd, South Hamilton, MA (US); Laurier St. Onge, Londonderry, NH (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/115,011

(22) Filed: Jul. 14, 1998

(51) Int. Cl.[7] .................. H04N 9/083; H04N 5/335; H01L 27/00
(52) U.S. Cl. .................. 348/272; 348/275; 348/324; 250/208.1
(58) Field of Search .................. 348/272–275, 348/316, 323, 280, 312, 265, 324, 241, 294; 358/513, 514; 250/208.1

(56) References Cited

U.S. PATENT DOCUMENTS

| | | | |
|---|---|---|---|
| 4,580,160 A | | 4/1986 | Ochi et al. .................. 358/48 |
| 4,712,137 A | * | 12/1987 | Kadekodi et al. .......... 348/323 |
| 5,132,803 A | | 7/1992 | Suga et al. |
| 5,148,268 A | * | 9/1992 | Tandon et al. .............. 358/213 |
| 5,293,240 A | * | 3/1994 | Matsunaga .................. 348/312 |
| 5,402,143 A | * | 3/1995 | Ge et al. .................... 345/102 |
| 5,452,001 A | * | 9/1995 | Hosier et al. ............... 348/312 |
| 5,459,509 A | * | 10/1995 | Monoi ........................ 348/323 |
| 5,461,397 A | * | 10/1995 | Zhang et al. ............... 345/102 |
| 5,477,345 A | * | 12/1995 | Tse ............................. 358/513 |
| 5,483,053 A | * | 1/1996 | Johnson et al. .......... 250/208.1 |
| 5,493,331 A | * | 2/1996 | Takahashi et al. .......... 358/514 |
| 5,521,640 A | | 5/1996 | Prater |
| 5,774,182 A | | 6/1998 | Mutoh et al. ............... 348/311 |
| 5,780,840 A | | 7/1998 | Lee et al. .................. 250/208.1 |
| 5,780,914 A | | 7/1998 | Kim ............................ 257/435 |
| 5,786,588 A | | 7/1998 | Takahashi |
| 5,801,850 A | * | 9/1998 | Maki et al. ................. 348/315 |
| 5,859,712 A | * | 1/1999 | Kim ............................ 358/514 |
| 5,969,830 A | * | 10/1999 | Kimura ....................... 348/272 |
| 5,998,779 A | * | 12/1999 | Kozuka ....................... 348/241 |
| 6,078,304 A | * | 6/2000 | Miyazawa .................. 345/102 |
| 6,166,831 A | * | 12/2000 | Boyd et al. ................. 348/275 |

* cited by examiner

Primary Examiner—Wendy R. Garber
Assistant Examiner—Lin Ye
(74) Attorney, Agent, or Firm—Wolf, Greenfield & Sacks, P.C.

(57) ABSTRACT

In one embodiment, an image sensor includes a linear pixel array and array readout lines, wherein the linear pixel array includes a group of pixels arranged in a row, and each array readout line is selectively coupled to an output of at least one pixel included in the group of pixels. In another embodiment, an image sensor includes a linear pixel array and an array readout line, wherein the linear pixel array includes a first group of pixels, sensitive to a first color of light, arranged in a first row, and a second group of pixels, sensitive to a second color of light, arranged in a second row, and the array readout line is selectively coupled to outputs of pixels included in the first group of pixels and outputs of pixels included in the second group of pixels. In another embodiment, an image sensor includes array readout lines and a pixel, wherein an output of the pixel is selectively coupled to each of the array readout lines such that the contents of the pixel may be provided to any one of the array readout lines without being provided to any other of the array readout lines. In another embodiment, an image sensor includes a linear pixel array and array readout lines, wherein the pixel array includes a group of pixels, sensitive to a particular color of light, arranged in a row, and each array readout line is selectively coupled to an output of at least one pixel included in the group of pixels.

27 Claims, 18 Drawing Sheets

PIXEL READOUT SCHEME FOR IMAGE SENSORS

BACKGROUND OF THE INVENTION

1. Field of the Invention

The present invention is directed to image sensors and, more particularly, to systems for reading out the contents of pixels in image sensors.

2. Discussion of Related Art

Image sensors are used to generate images based upon the outputs of a large number of light-sensitive pixels arranged in an array. Each pixel in such an array generates an output signal that is proportional to an amount of light that is incident on that pixel during a so-called "integration period." All of the pixels in an array generally are permitted to "integrate" for a predetermined amount of time during an integration period and the contents of the pixels are individually "read out" during a so-called "read out period."

Pixels may be arranged in a linear array of "n" pixels (a linear sensor). Such a linear (one-dimensional) array of pixels may be moved in a direction perpendicular to the direction in which the array is oriented to a number of equi-spaced positions, integrating and reading out the contents of the pixels at each position, in order to measure the light incident on a two-dimensional area.

In a complementary metal oxide semiconductor (CMOS) linear sensor, a single array readout line generally is used to read out the contents of the pixels in the sensor's linear array, and outputs of each of the pixels in the array are sequentially provided to the array readout line (e.g., via switches). A certain period of time is required to allow the signal on the array readout line to settle before using external circuitry to measure the signal on the line. The speed at which the contents of pixels may be read out of the array therefore is limited by the settling time of the readout line. This settling time is determined primarily by the capacitance of the array readout line.

The switches that selectively provide the contents of the pixels to the array readout line generally are implemented using metal oxide semiconductor (MOS) transistors. Each of these MOS transistors has a gate-to-source or gate-to-drain capacitance associated with it that, when connected to the array readout line, incrementally increases the readout line's overall capacitance. The capacitance added by each of these switches therefore limits the rate at which the outputs of the pixels can be selectively provided to the array readout line.

Similarly, because each of the switches is connected to the array readout line via a circuit trace having a particular length, each such circuit trace incrementally increases the overall capacitance of the array readout line. The capacitance added by each of these circuit traces to the array readout line also limits the rate at which the outputs of the pixels may be selectively provided to the array readout line.

What is needed, therefore, is an improved pixel readout scheme for image sensors.

SUMMARY OF THE INVENTION

According to one aspect of the present invention, an image sensor includes a linear pixel array and array readout lines. The linear pixel array includes a group of pixels arranged in a row. Each array readout line is selectively coupled to an output of at least one pixel included in group of pixels.

According to another aspect of the invention, an image sensor includes a linear pixel array and an array readout line. The linear pixel array includes a first group of pixels, sensitive to a first color of light, arranged in a first row, and a second group of pixels, sensitive to a second color of light, arranged in a second row. The array readout line is selectively coupled to outputs of pixels included in the first group of pixels and outputs of pixels included in the second group of pixels.

According to another aspect, an image sensor includes array readout lines and a pixel. An output of the pixel is selectively coupled to each of the array readout lines such that the contents of the pixel may be provided to any one of the array readout lines without being provided to any other of the array readout lines.

According to yet another aspect, an image sensor includes a linear pixel array and array readout lines. The linear pixel array includes a group of pixels, sensitive to a particular color of light, arranged in a row. Each array readout line is selectively coupled to an output of at least one pixel included in the first group of pixels.

BRIEF DESCRIPTION OF THE DRAWINGS

The present invention will be more clearly appreciated from the following detailed description when taken in conjunction with the accompanying drawings, in which like-reference numerals indicate like structures or method steps, and in which the left-most one or two numerals of a reference numeral indicate the number of the figure in which the referenced element first appears, and in which.

DETAILED DESCRIPTION OF THE INVENTION

Figure 1:
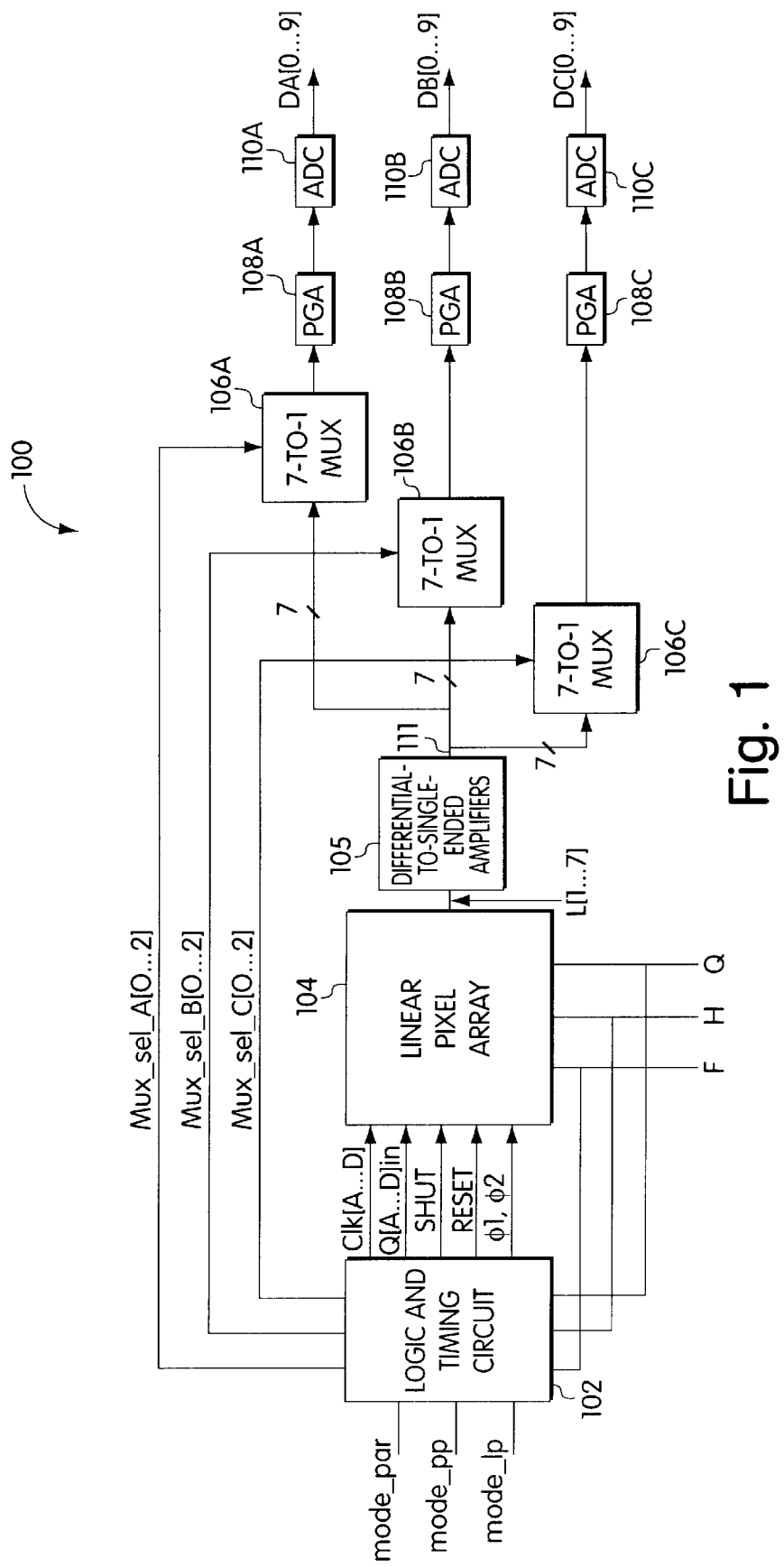
FIG. 1 is a block diagram showing a system for reading out the contents of pixels in a linear pixel array according to one embodiment of the invention.

FIG. 1 is a block diagram showing a system 100 for reading out the contents of pixels in a linear pixel array 104 according to one embodiment of the present invention. As shown, system 100, in addition to linear pixel array 104, includes a logic and timing circuit 102, differential-to-single-ended amplifiers 105, seven-to-one multiplexers 106A–C, programmable-gain amplifiers (PGAs) 108A–C, and analog-to-digital converters (ADCs) 110A–C. FIG. 1 also shows several signal lines interconnecting the various elements of system 100. These signal lines correspond to the identically-labeled signal lines that are shown in FIGS. 2–4, 7, 11, and 15, which show various components of system 100 in more detail. It should be appreciated that additional signal lines may be provided to increase the performance or facilitate the operation of system 100, or fewer or different signal lines may be provided when employing simpler or different embodiments of the invention.

Logic and timing circuit 102 controls the timing of system 100. Signals generated by logic and timing circuit 102 are provided to the various system components via the signal lines illustrated in FIG. 1. These signals may be generated using hardware, firmware, software or any combination thereof. The details of how logic and timing circuit 102 generate signals are unimportant to understand the invention and therefore will not be described.

Linear pixel array 104 is controlled by logic and timing circuit 102 to provide the contents of pixels within linear pixel array 104 to selected ones of array readout lines $L[_{1\ldots 7}]$. Each of array readout lines $L[_{1\ldots 7}]$ represents a pair of conductors on which a differential signal from the linear pixel array 104 may be provided. A single line is used to represent each pair of conductors forming one of the array readout lines $L[_{1\ldots 7}]$, however, to simplify the depiction of these lines in FIGS. 1, 2, 7, 11, and 15.

Differential-to-single-ended amplifiers 105 include seven separate differential-to-single-ended amplifiers. Each of these seven amplifiers receives a differential input from one of array readout lines $L[_{1\ldots 7}]$ and provides a single-ended output on one of seven output lines 111.

The order in which the contents of the pixels in pixel array 104 are read out, as well as the array readout lines $L[_{1\ldots 7}]$ onto which the outputs of these pixels are provided, is determined in response to resolution-select signals on full, half, and quarter-resolution control lines F, H and Q, respectively, and mode-select signals on parallel, pixel-packed, and line-packed mode select lines mode_par, mode_pp and mode_lp, respectively. Timing diagrams showing control signals CLK[A . . . D] and Q[A . . . D]$_{in}$ which may be generated by logic and timing circuit 102 and provided to linear pixel array 104 to read out the contents of pixels from pixel array 104: (1) in either full, half, or quarter-resolution mode, and (2) in either parallel, pixel-packed, or line-packed modes, are shown in FIGS. 8–10, 12–14, and 16–18. FIGS. 8–10, 12–14 and 16–18 also show the times at which information is provided to array readout lines $L[_{1\ldots 7}]$ from linear pixel array 104 in response to these signals.

Additionally, resolution-select signals on resolution control lines F, H and Q, and mode-select signals on mode-select lines mode_par, mode_pp and mode_lp determine the control signals that are to be generated by logic and timing circuit 102 and provided on multiplexer select lines mux_sel_A[0 . . . 2], mux_$_{sel}$_B[0 . . . 2] and mux_sel_C[0 . . . 2] in order to control the selection of outputs of the seven differential-to-single-ended amplifiers 105 by multiplexers 106A–C. These multiplexer control signals are described in more detail below in connection with the description of the timing diagrams shown in FIGS. 8–10, 12–14, and 16–18.

When a pixel-packed or line-packed mode of operation is selected, only one of multiplexers 106A–C produces a valid output signal. When parallel output mode is selected, however, each of multiplexers 106A–C produces a valid output signal. Therefore, in pixel packed or line packed modes of operation, digital data is provided at only one of digital outputs DA, DB and DC, whereas when a parallel mode of operation is selected, digital data is provided simultaneously at all three of digital outputs DA, DB and DC. Each of digital outputs DA, DB and DC may be a single line that provides a serial stream of data or may include several parallel lines on which several bits of data are provided in parallel, as illustrated in FIG. 1.

Figure 2:
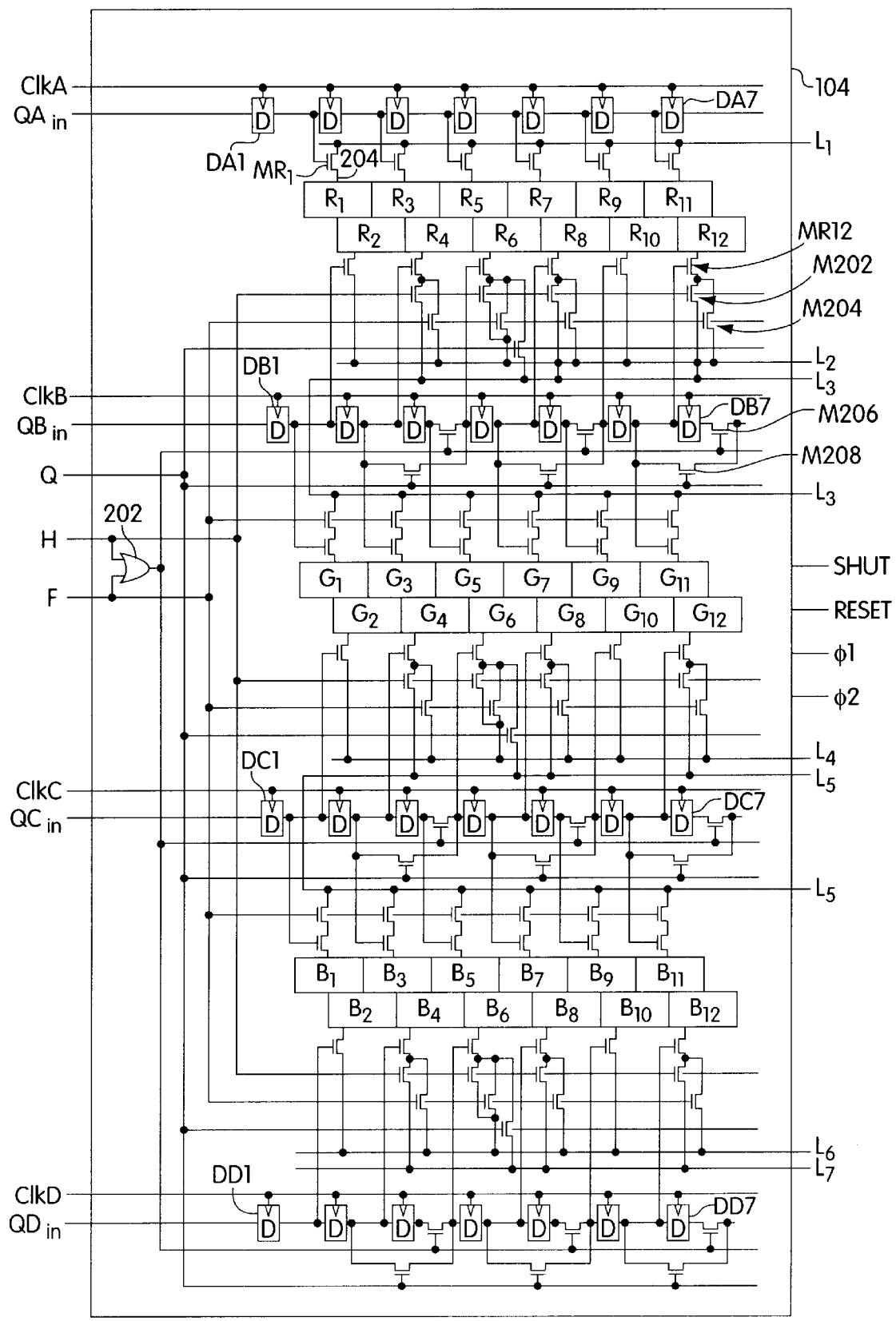
FIG. 2 is a partial schematic/partial block diagram showing an exemplary embodiment of the linear pixel array shown in FIG. 1.

FIG. 2 is a partial schematic/partial block diagram showing an exemplary embodiment of linear pixel array 104 (FIG. 1). As shown, linear pixel array 104 includes a group of red pixels $R_1$–$R_{12}$, a group of green pixels $G_1$–$G_{12}$, and a group of blue pixels $B_1$–$B_{12}$. Each of these groups of pixels is divided into two adjacent, staggered rows of pixels. That is, the group of red pixels is divided into a first row of odd-numbered pixels $R_1$–$R_{11}$ and a second, adjacent row of even-numbered pixels $R_2$–$R_{12}$; the group of green pixels is divided into a first row of odd-numbered pixels $G_1$–$G_{11}$ and a second, adjacent row of even-numbered pixels $G_2$–$G_{12}$; and the group of blue pixels is divided into a first row of odd-numbered pixels $B_1$–$B_{11}$ and a second, adjacent row of even-numbered pixels $B_2$–$B_{12}$. The embodiment shown in FIG. 2 shows only twelve pixels of each color, but it should be appreciated that a much larger number of pixels of each color (eg., five-thousand one-hundred and sixty four pixels of each color) may be employed. It should also be appreciated that pixels sesitive to different colors of light than those shown in the FIG. 2 example may be employed in connection with alternative embodiments, and that the invention is not limited to pixels that are sensitive to any particular color(s) of light.

In the FIG. 2 embodiment, each of the pixels in linear array 104 has a pixel-select transistor (e.g., pixel-select transistor $MR_{12}$) associated with it. Linear array 104 also includes a number of line-select transistors (e.g., line-select transistors M202 and M204). The pixel-select transistors and the line-select transistors are coupled between the outputs of pixels in linear array 104 and array readout lines $L[_{1\ldots 7}]$. Each of the line-select transistors and each of the pixel-select transistors in FIG. 2 represents a pair of transistors coupled between a pair of output leads of a pixel (which provide a differential output signal) and a pair of conductors represented by one of array readout lines $L[_{1\ldots 7}]$. Only a single transistor is used to represent each pair of line-select and pixel-select transistors to simplify the depiction of the FIG. 2 embodiment.

The pixel-select transistors are used to select (as described below) particular pixels in the array 104 for output to array readout lines $L[_{1\ldots 7}]$. The line-select transistors (e.g., line-select transistors M202 and M204) determine which pixel outputs are provided on which array readout lines $L[_{1\ldots 7}]$ when corresponding pixel-select transistors, e.g., pixel-select transistor $MR_{12}$, are activated. Resolution-select signals on resolution-select lines Q, H and F are applied to gates of particular line-select transistors for this purpose. Linear pixel array 104 includes an "OR" gate 202 that produces an output signal which is the logical "or" result of the signals on resolution-select lines H and F.

Linear pixel array 104 includes four distinct rows of D flip-flops DA[1 . . . 7], DB[1 . . . 7]. DC[. . . 7], and DD[. . . 7] interspersed between the pixel rows. An output of each of these D flip-flops is connected to the gates of at least one pair of pixel-select transistors (represented by a single transistor in FIG. 2) to provide a pixel-select signal thereto. When the pixel-select signal for a particular pair of pixel-select transistors is active, the differential output of selected pixel is provided to one of array readout lines $L[_{1\ldots 7}]$. The outputs of several of D flip-flops DB[1 . . . 7] and DC[1 . . . 7] are connected to the gates of pixel-select transistors associated with pixels included in two different rows. Resolution-select signals on resolution control lines Q, H and F control the interconnections between the outputs and the inputs of different ones of the D flip-flops by selectively activating particular resolution-select transistors, e.g., resolution-select transistors M206 and M208.

Each distinct group of D flip-flops (i.e., group DA[1 . . . 7], DB[1 . . . 7], DC[1 . . . 7] or DD[1 . . . 7]) receives a common clock signal on one of clock input lines CLK[A . . . D] and receives an input signal on a respective one of "Q" input lines Q[A . . . D]$_{in}$. For simplicity of understanding, relevant portions of linear pixel array 104 are reproduced in FIGS. 7, 11, and 15 to illustrate the configuration of the circuit in full, half, and quarter-resolution modes, respectively. The operation of linear pixel array 104, when configured in each of these three resolution modes, will be described in more detail below in connection with the description of FIGS. 7, 11, and 15.

Array readout lines $L[_{1\ldots 7}]$ are interspersed between the red, green, and blue rows of pixels. For each of the red, green and blue rows of pixels, outputs of the even-numbered pixels and outputs of the odd-numbered pixels are selectively connected (via a pair of pixel-select transistors and, in some cases, one or more pairs of line-select transistors) to two different ones of readout lines $L[_{1\ldots 7}]$. For example, the outputs of odd-numbered red pixels $R_1$–$R_{11}$ are selectively connected to array readout line $L_1$ and the outputs of even-numbered red pixels $R_2$–$R_{12}$ are selectively connected to array readout line $L_2$. Therefore, when full-resolution mode is selected, contents of the odd and even-numbered pixels may be read out alternately on two different array readout lines.

Similarly, outputs of adjacent even-numbered pixels in each of the red, green and blue rows are selectively connected to two different ones of readout lines $L[_{1\ldots 7}]$. For example, outputs of red pixels $R_2$, $R_6$ and $R_{10}$ are selectively connected to array readout line $L_2$ and outputs of red pixels $R_4$, $R_8$ and $R_{12}$ are selectively connected array readout line $L_3$. Therefore, when half-resolution mode is selected, the contents of the even-numbered pixels in a particular row may be read out alternately on two different array readout lines.

Further, for each of the red, green and blue pixel rows, the output of every other even-numbered pixel is selectively connected to a different one of array readout lines $L[_{1\ldots 7}]$. For example, the outputs of red pixels $R_2$ and $R_{10}$ are selectively connected to array readout line $L_2$ and the output of red pixel $R_6$ is selectively connected to array readout line $L_3$. Therefore, when quarter-resolution mode is selected, the contents of every other even-numbered pixel may be read out alternately on two different array readout lines.

This use of multiple array readout lines to read out the contents of several sequentially-accessed pixels provides many advantages related to the speed at which the contents of the pixels in the array may be read out.

For example, the total capacitance of each of the multiple array readout lines can be significantly less than the capacitance that would exist on a single readout line if only one readout line were used. This decrease in capacitance is due in part to the fact that the capacitance added by the parasitic capacitances of the pixel-select and/or line-select transistors is distributed over multiple array readout lines rather than being added to the total capacitance of a single array readout line. Additionally, the capacitance added by the circuit traces connecting the pixel-select and/or line-select transistors to the array readout lines is distributed over the multiple array readout lines, rather than being added to a total capacitance of single array readout line. The lower capacitance seen by the output of each of the pixels reduces the time required for the output signal of each pixel to settle on one of the array readout lines before it is stable enough to be sampled (as compared to the time that would be required for the pixel output signal to settle on a single shared array readout line).

An output of each pixel in linear array 104 is selectively connected to at least one of array readout lines $L[_{1\ldots 7}]$. Outputs of several pixels are selectively connected to two different ones of array readout lines $L[_{1\ldots 7}]$. For example, an output of pixel $R_{12}$ is selectively connected to both of array readout lines $L_2$ and $L_3$. This feature permits the contents of a particular pixel to be provided to an appropriate one of array readout lines $L[_{1\ldots 7}]$, depending on the selected resolution mode, so that sequentially-accessed pixels may be provided alternately on two different array readout lines.

Additionally, each of array readout lines $L[_{1\ldots 7}]$ is selectively connected to the outputs of pixels included in at least one of the red, green or blue rows of pixels. Two of the array readout lines are selectively connected to the outputs of pixels included in two different ones of the red, green and blue rows of pixels. For example, readout line $L_3$ is selectively connected to: (1) the outputs of red pixels $R_4$, $R_6$, $R_8$ and $R_{12}$ and (2) the outputs of odd-numbered green pixels $G_1$–$G_{11}$. Whether readout line $L_3$ provides the contents of red pixels or green pixels depends on whether system 104 is configured to operate in full, half or quarter-resolution mode. This sharing of array readout lines between rows of different-colored pixels and use of the shared readout lines to read out the contents of pixels in one of two different rows (depending on the selected resolution mode) reduces the total number of readout lines that are required to be interspersed between the pixel rows in order to read out the contents of pixels in the several resolution modes, thereby providing a significant design advantage.

Figure 3:
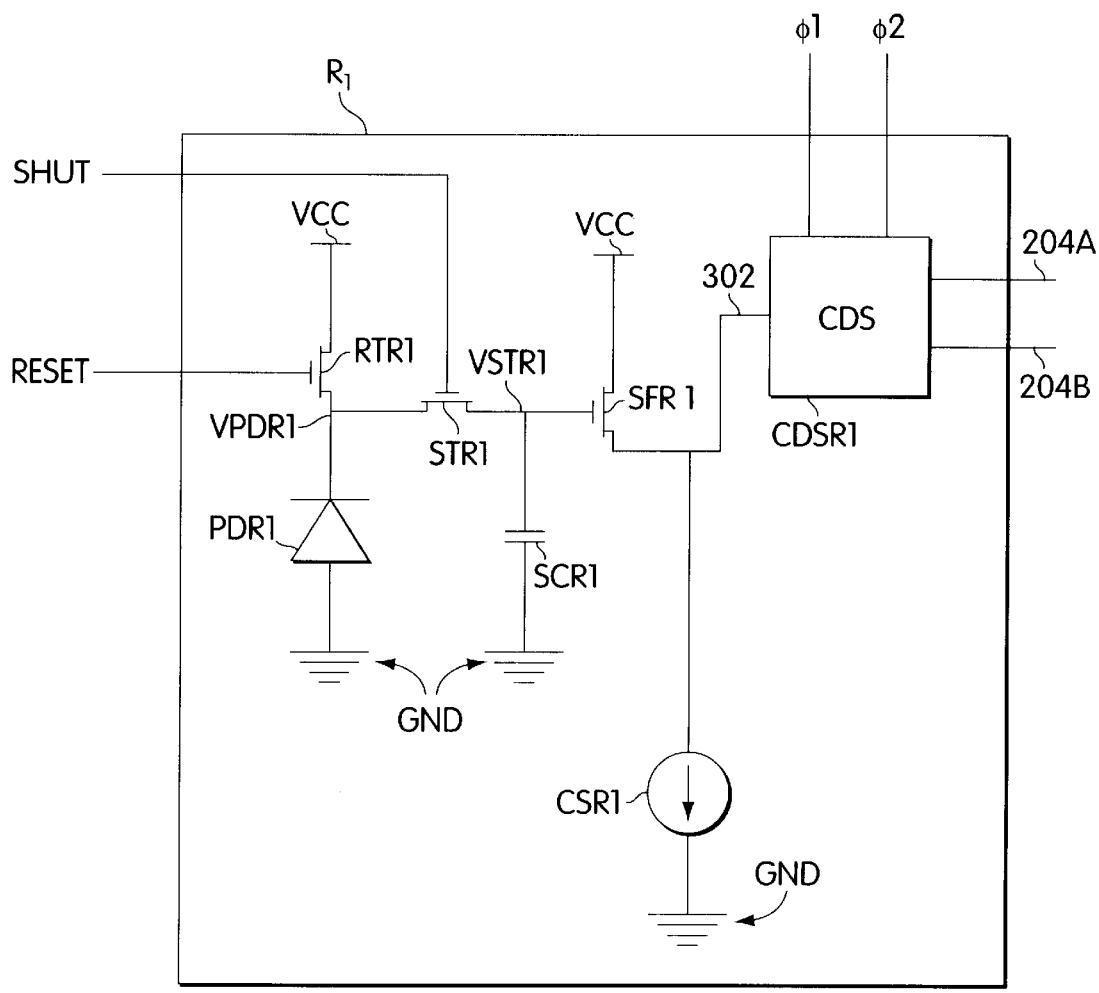
FIG. 3 is a partial schematic/partial block diagram showing an exemplary embodiment of one of the pixels shown in FIG. 2.

FIG. 3 shows an exemplary embodiment of one of the pixels in linear pixel array 104, e.g., pixel $R_1$. Except for being filtered to be sensitive to different colors of light, each of the pixels in pixel array 104 is configured identically. Therefore, the pixel shown in FIG. 3 is illustrative of each of the pixels in array 104. As shown, pixel $R_1$ includes a corresponding photodiode PDR1, a reset transistor RTR1, a shutter transistor STR1, a storage capacitor SCR1, a source-follower transistor SFR1, a current source CSR1, and a correlated double-sampling (CDS) circuit CDSR1. The anode of photodiode PDR1 is connected to ground node GND and the cathode of photodiode PDR1 is connected, via reset transistor RTR1, to power supply node VCC. The cathode of photodiode PDR1 also is connected, via shutter transistor STR1, to the gate of source-follower transistor SFR1 and to one pole of storage capacitor SCR1, the other pole of which is connected to ground node GND. The drain of source-follower transistor SFR1 is connected to power supply node VCC and the source of transistor SFR1 is connected to an input 302 of the CDS circuit CDSR1. Current source CSR1 is connected to the source of transistor SFR1 to bias it properly. The operation of each of the pixels in array 104 is described in more detail below in connection with the description of the timing diagram shown in FIG. 5.

Figure 4:
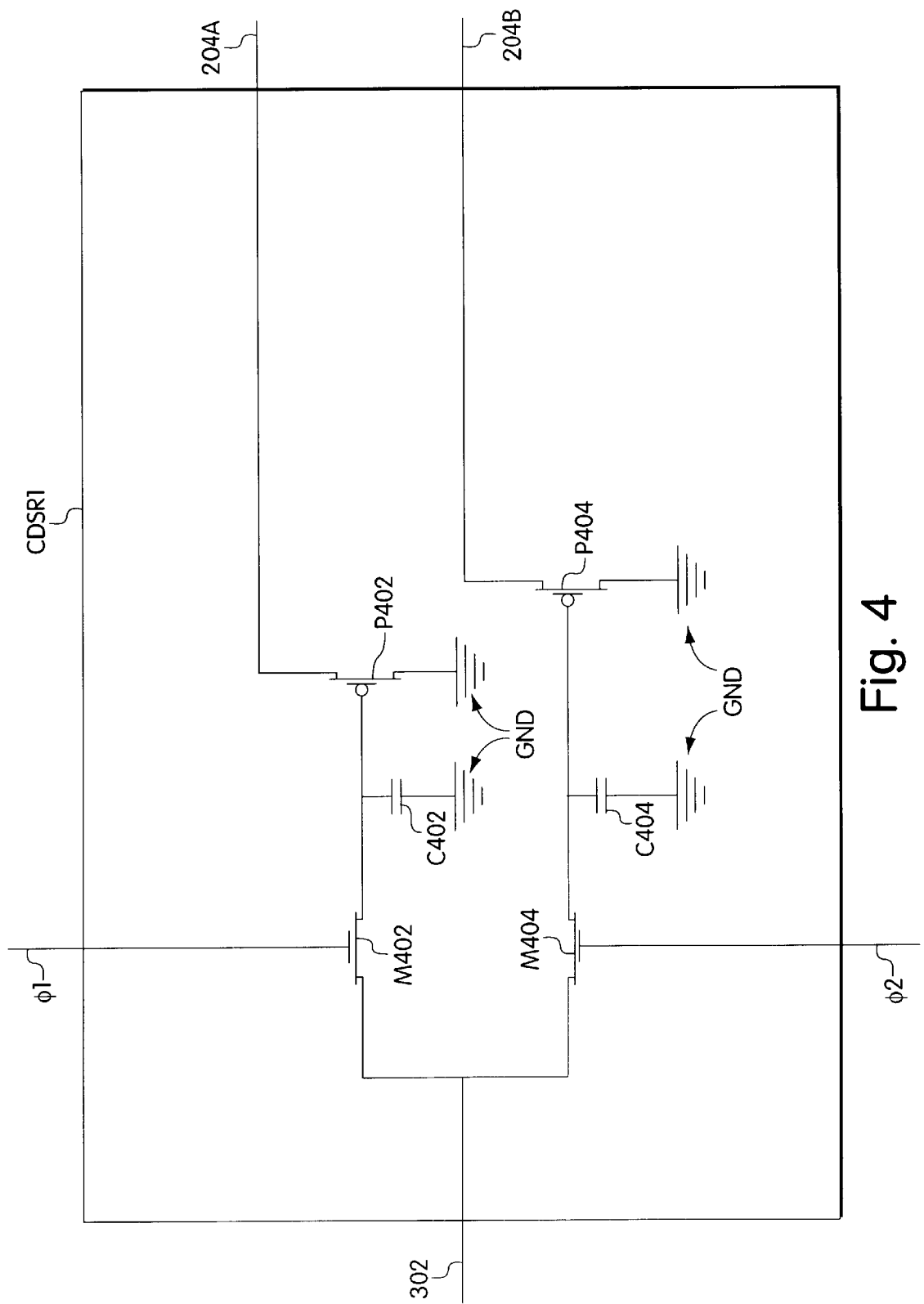
FIG. 4 is a partial schematic/partial block diagram showing an exemplary embodiment of the correlated double-sampling circuit shown in FIG. 3.

FIG. 4 is a partial schematic/partial block diagram showing an exemplary embodiment of CDS circuit CDSR1 (FIG. 3). As shown, CDS circuit CDSR1 includes two switch transistors M402 and M404, two storage capacitors C402 and C404, and two-source follower transistors P402 and P404. Switch transistors M402 and M404 are coupled, respectively, between input node 302 and the gates of source follower transistors P402 and P404. The gates of source follower transistors P402 and P404 also are connected to first poles of storage capacitors C402 and C404, respectively, the second poles of which are connected to ground node GND. Outputs of source-follower transistors P402 and P404 are connected to a pair of output leads 204A and 204B of pixel $R_1$. Output leads 204A and 204B of CDS circuit CDSR1 are connected to a pair of pixel-select transistors represented by pixel select transistor $MR_1$ in FIG. 2. Output leads 204A and 204B are represented by output lead 204 in FIG. 2. Similarly, outputs leads of the CDS circuits included in the other pixels of linear pixel array 104 are connected to respective pairs of pixel-select transistors represented by the pixel-select transistors shown in FIG. 2.

The gates of switch transistors M402 and M404 are connected, respectively, to control lines Φ1 and Φ2. The signals applied to control lines Φ1 and Φ2 are shown and described in detail below in connection with the description of the timing diagram shown in FIG. 6. If the circuit shown in FIG. 4 is operated such that the signal on line Φ1 is active during a first time period and the signal on line Φ2 is active during a second time period that follows the first time period, then the resulting voltage between output leads 204A and 204B during the second time period will have an amplitude equal to the difference between the amplitude of the voltage on line 302 during the first time period and the amplitude of the voltage on line 302 during the second time period. Therefore, the CDS circuit shown in FIG. 4 acts as a subtraction circuit that subtracts the amplitude of the voltage on line 302 during first and second time periods, as defined by the signals on control lines Φ1 and Φ2, respectively.

Figure 5:
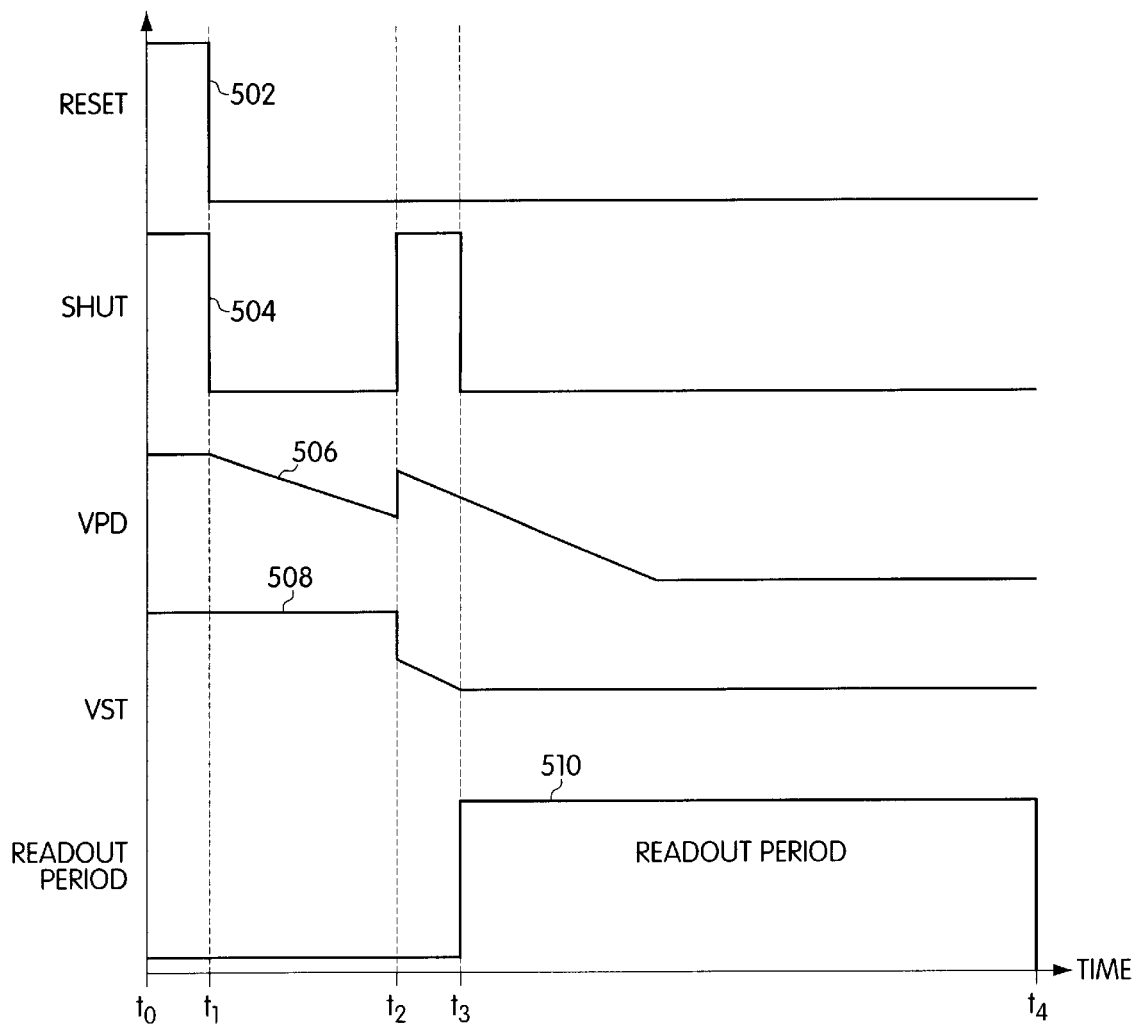
FIG. 5 is a timing diagram illustrating examples of signals that may be used to cause the pixels included in the linear array shown in FIG. 2 to integrate charge.

FIG. 5 is a timing diagram that illustrates examples of signals that may be used to cause each of the pixels in linear pixel array 104 (FIG. 2), such as pixel $R_1$ (FIG. 3), to integrate charge, and how this integrated charge may be stored on storage capacitors within the pixels prior to reading out the contents of the individual pixels in the pixel array. The curves of FIG. 5 are shown on the same time scale (horizontal axis) for comparison. The physical placement of one curve above another does not denote that the signal represented by one curve attains a higher amplitude than the signal represented by the other.

Curves 502 and 504 illustrate signals that may be applied to control lines RESET and SHUT, respectively, in order to cause each of the pixels in pixel array 104 (FIG. 2) to integrate charge and store this integrated charge on its storage capacitor (e.g., SCR1).

Curves 506 and 508 illustrate, respectively, the voltage at the cathode of the photodiode of the pixel (e.g., node VPDR1) and the voltage at the gate of the source-follower transistor of the pixel (e.g., node VSTR1). It should be appreciated that the voltages at the nodes VPD and VST of each of the pixels will vary depending on the amount of light that is incident on that pixel.

Curve 510 illustrates the time period, after all of the pixels in the array have been caused to integrate charge and the integrated charge stored, during which the contents of each of the pixels in the array may be read out. As indicated by the non-infinite duration of curve 510, there is a limited period of time during which the charge stored by the storage capacitors in the pixels will remain accurate. The pixels therefore should be read out during the period indicated by curve 510 or else a new integration of the array should be performed.

As shown, curves 502 and 504 begin (at time t0) in an active state such that the reset transistor and the shutter transistor (e.g., RTR1 and STR1) within each pixel are turned on. At this point, the storage capacitor in each pixel (e.g., storage capacitor SCR1) is charged to its maximal value, as indicated by curve 506 (at time $t_0$). Next, at time $t_1$, the signals on control lines RESET and SHUT are deactivated such that the reset and shutter transistors are turned off. During the period between times $t_1$ and $t_2$, light incident on the photodiodes (e.g., PDR1) will cause the voltages at the cathodes of the photodiodes (e.g., at node VPDR1) to decrease in proportion to the intensity of the light incident thereon, as indicated by the decreasing level of curve 506 between times $t_1$ and $t_2$.

Next, after a predetermined integration period between times $t_1$ and $t_2$, the signal on control line SHUT for each of the pixels is activated temporarily. At time $t_2$, the charge on the cathode of each photodiode (e.g., at node VPDR1) and the charge previously stored on each storage capacitor (e.g., at node VSTR1) equalize such that the voltages on the storage capacitors instantaneously decrease and the voltages on the cathodes of the photodiodes instantaneously increase, as illustrated by curves 508 and 506, respectively, at time $t_2$.

During the brief period between times $t_2$ and $t_3$, the voltages at the cathodes of the photodiodes and the voltages on the storage capacitors both decrease in proportion to the intensity of the light incident on the photodiodes, as illustrated by the decreasing level of curves 506 and 508 between times $t_2$ and $t_3$.

Finally, as illustrated by curve 508, after the signal on control line SHUT for each of the pixels is deactivated at time $t_3$, the charge remaining on each of the storage capacitors is indicative of the intensity of the light that was incident on the photodiodes associated with the storage capacitors during the integration period. This stored charge remains constant during the readout period 510 for the entire linear array. Curve 510 does not represent a signal using connection with this embodiment of the invention. Rather, curve 510 is shown only to illustrate a time period during which the pixels in pixel array 104 store valid data.

Figure 6:
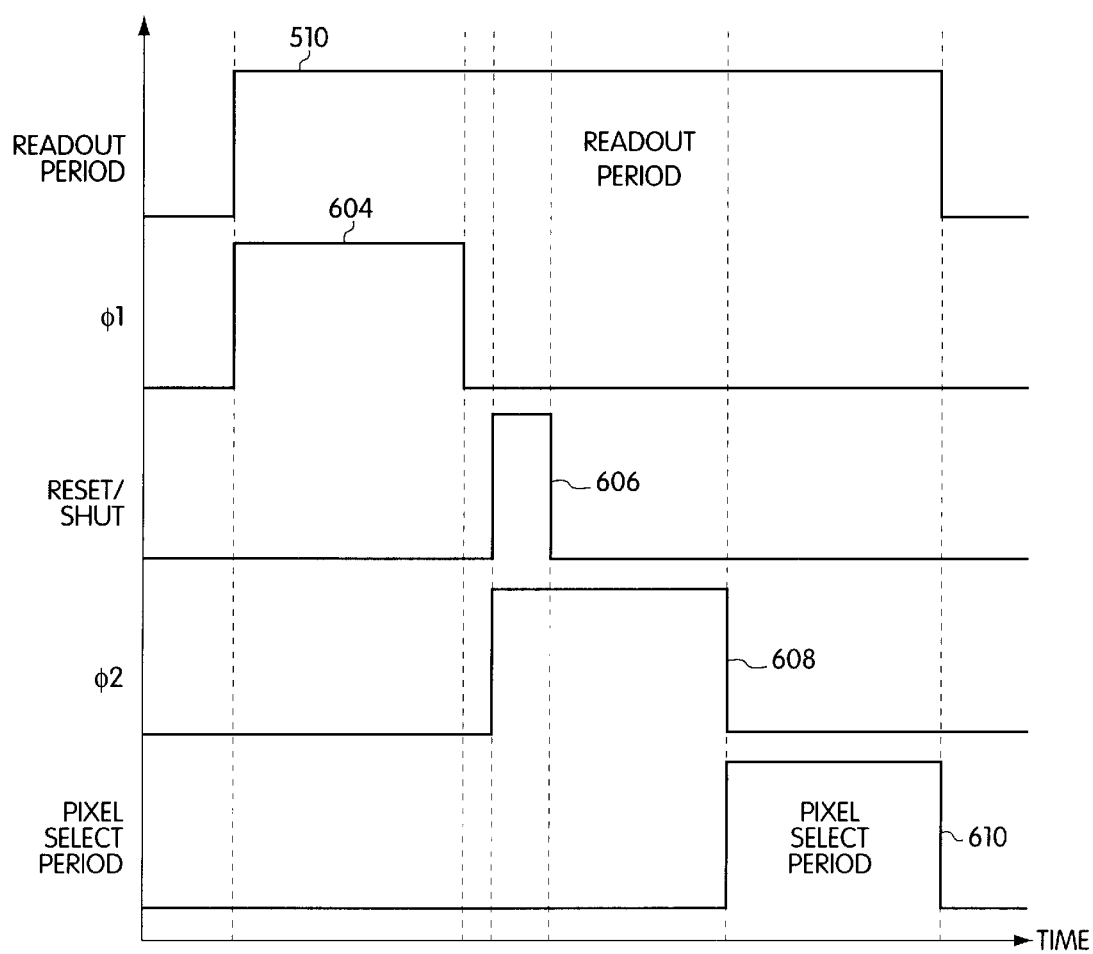
FIG. 6 is a timing diagram illustrating examples of signals that may be used to operate the correlated double-sampling circuits included in the pixels shown in FIG. 2.

FIG. 6 illustrates examples of signals that may be used to operate the CDS circuits within the pixels of pixel array 104 (e.g., CDS circuit CDSR1 shown in FIG. 4). The curves of FIG. 6 are shown on the same time scale (horizontal axis) for comparison. The physical placement of one curve above another does not denote that the signal represented by the one curve attains a higher amplitude than the signal represented by the other.

Although shown on a different time scale, curve 510 in FIG. 6 is identical to curve 510 shown in FIG. 5.

Curves 604 and 608 in FIG. 6 represent, respectively, control signals that may be applied to control lines Φ1 and Φ2 (FIG. 4) during the readout period 510.

Curve 606 in FIG. 6 represents signals applied to both the control line RESET and the control line SHUT for all of the pixels in the array.

Finally, curve 610 in FIG. 6 illustrates a time period during which appropriate pairs of pixel-select transistors (e.g., the pair of transistors represented by pixel-select transistor $MR_{12}$ in FIG. 2) may be sequentially turned on to provide the outputs of the pixels to appropriate pixel readout lines $L[_{1\ ...\ 7}]$.

Figure 7:
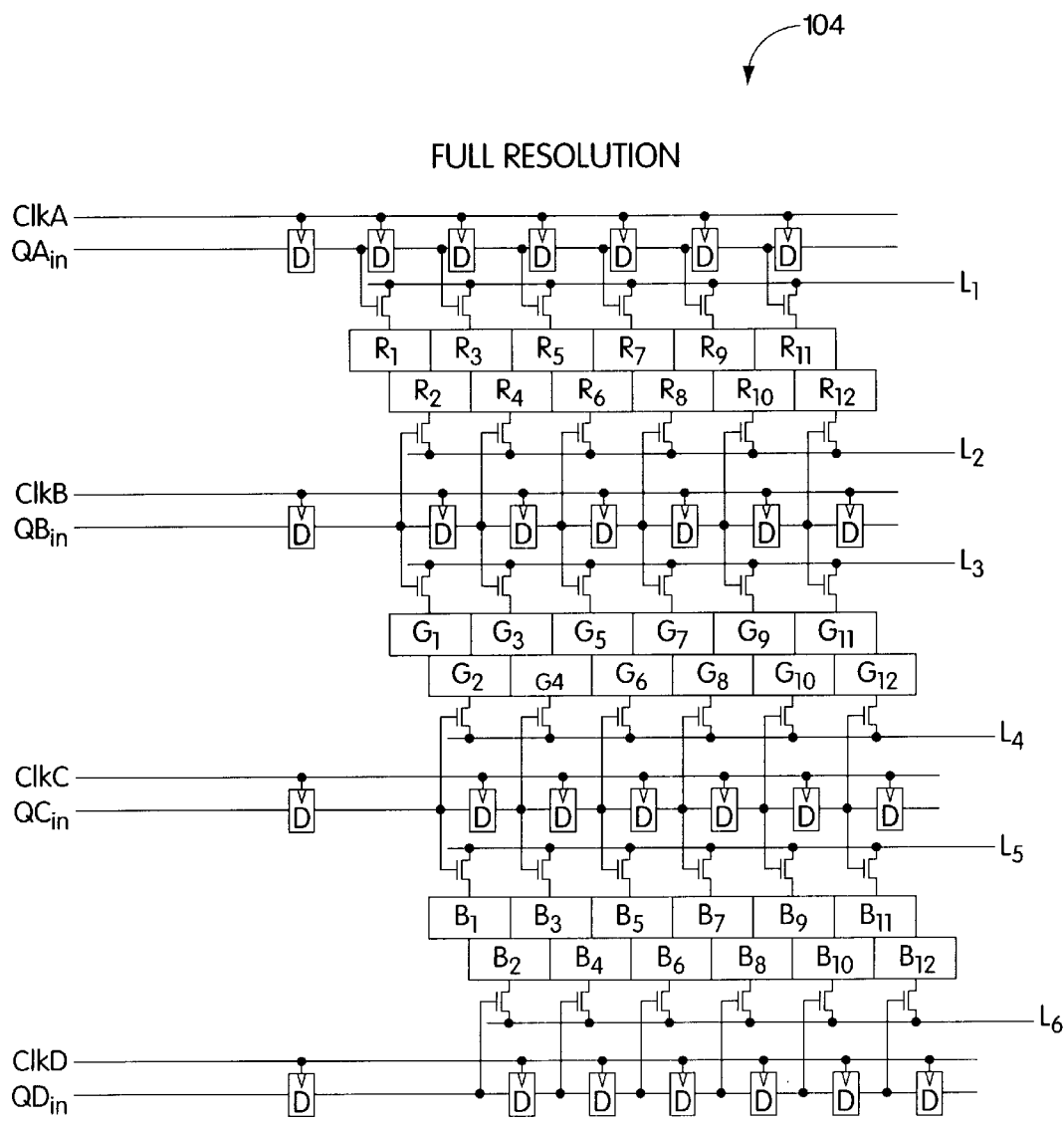
FIG. 7 is a partial schematic/partial block diagram illustrating how the circuit shown in FIG. 2 appears when configured to operate in full-resolution mode.

FIG. 7 shows linear pixel array 104 (FIG. 2) when configured in full-resolution mode. That is, FIG. 7 illustrates how linear pixel array 104 appears when a resolution-select signal on control line F is active and the resolution-select signals on control lines Q and H are inactive (the connections between the sources and drains of activated transistors being shown as short circuits).

When configured in full-resolution mode: (1) the contents of the odd-numbered red pixels are provided on array readout line $L_1$, (2) the contents of the even-numbered red pixels are provided on array readout line $L_2$, (3) the contents of the odd-numbered green pixels are provided on array readout line $L_3$, (4) the contents of the even-numbered green pixels are provided on array readout line $L_4$, (5) the contents of the odd-numbered blue pixels are provided on array readout line $L_5$, and (6) the contents of the even-numbered blue pixels are provided on array readout line $L_6$.

Figure 8:
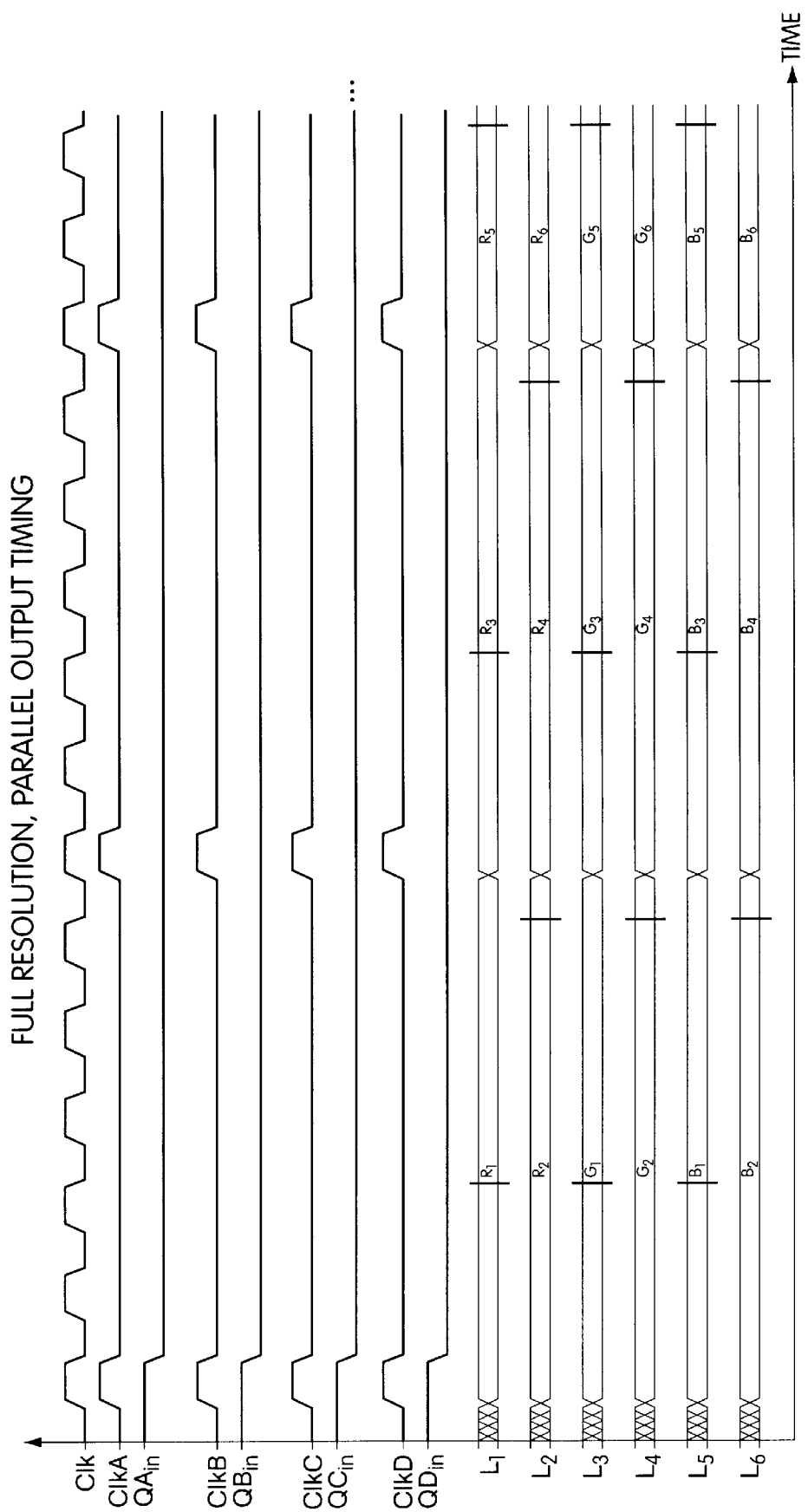
FIGS. 8–10 are timing diagrams illustrating examples of signals that may be used to operate the circuit shown in FIG. 7.

FIG. 8 shows examples of signals that may be generated by logic and timing circuit 102 and applied to control lines CLK, CLK[A ... D] and Q[A ... D]$_{in}$ of linear pixel array 104 (as configured in FIG. 7) in order to read out the contents of the pixels in pixel array 104 in full-resolution, parallel output format.

The vertical lines passing through the curves representing the signals presented on each of array read out lines $L[_{1\ ...\ 6}]$ indicate times that the red, green and blue pixel contents provided on these readout lines may be sampled in parallel.

Multiplexer 106A (FIG. 2) may be controlled to select alternately between the outputs of the differential-to-single-ended amplifiers 105 that are driven by array read out lines $L_1$ and $L_2$. In this manner, the single-ended signals produced in response to the differential signals on array readout lines $L_1$ and $L_2$ may be provided at the output of multiplexer 106A at times corresponding to the locations of the vertical lines passing through the curves representing the signals on these readout lines. PGA 108A may amplify these single-ended signals, and ADC 110A may sample the output of PGA 108A at the times indicated by the vertical lines, thereby providing data at digital output DA representing the contents of each of red pixels $R_1$–$R_{12}$.

Similarly, multiplexer 106B may be controlled to select alternately between the outputs of the differential-to-single-ended amplifiers 105 that are driven by array read out lines $L_3$ and $L_4$. In this manner, the single-ended signals produced in response to the differential signals on array readout lines $L_3$ and $L_4$ may be provided at the output of the multiplexer 106B at times corresponding to the locations of the vertical lines passing through the curves representing the signals on these readout lines. PGA 108B may amplify these single-ended signals, and ADC 110B may sample the output of PGA 108B at the times indicated by the vertical lines, thereby providing data at digital output DB representing the contents of each of green pixels $G_1$–$G_{12}$.

Finally, multiplexer 106C may be controlled to select alternately between the outputs of the differential-to-single-ended amplifiers 105 that are driven by array read out lines $L_5$ and $L_6$. In this manner, the single-ended signals produced in response to the differential signals on array readout lines $L_5$ and $L_6$ may be provided at the output of the multiplexer 106C at times corresponding to the locations of the vertical lines passing through the curves representing the signals on these readout lines. PGA 108C may amplify these single-ended signals, and ADC 110C may sample the output of PGA 108C at the times indicated by the vertical lines, thereby providing data at digital output DC representing the contents of each of blue pixels $B_1$–$B_{12}$.

Thus, when configured to operate in full-resolution, parallel output format, by properly controlling multiplexers 106A–C, system 100 provides digital signals at outputs DA, DB and DC in parallel, which signals represent the outputs of each of the red, green and blue pixels, respectively.

Figure 9:
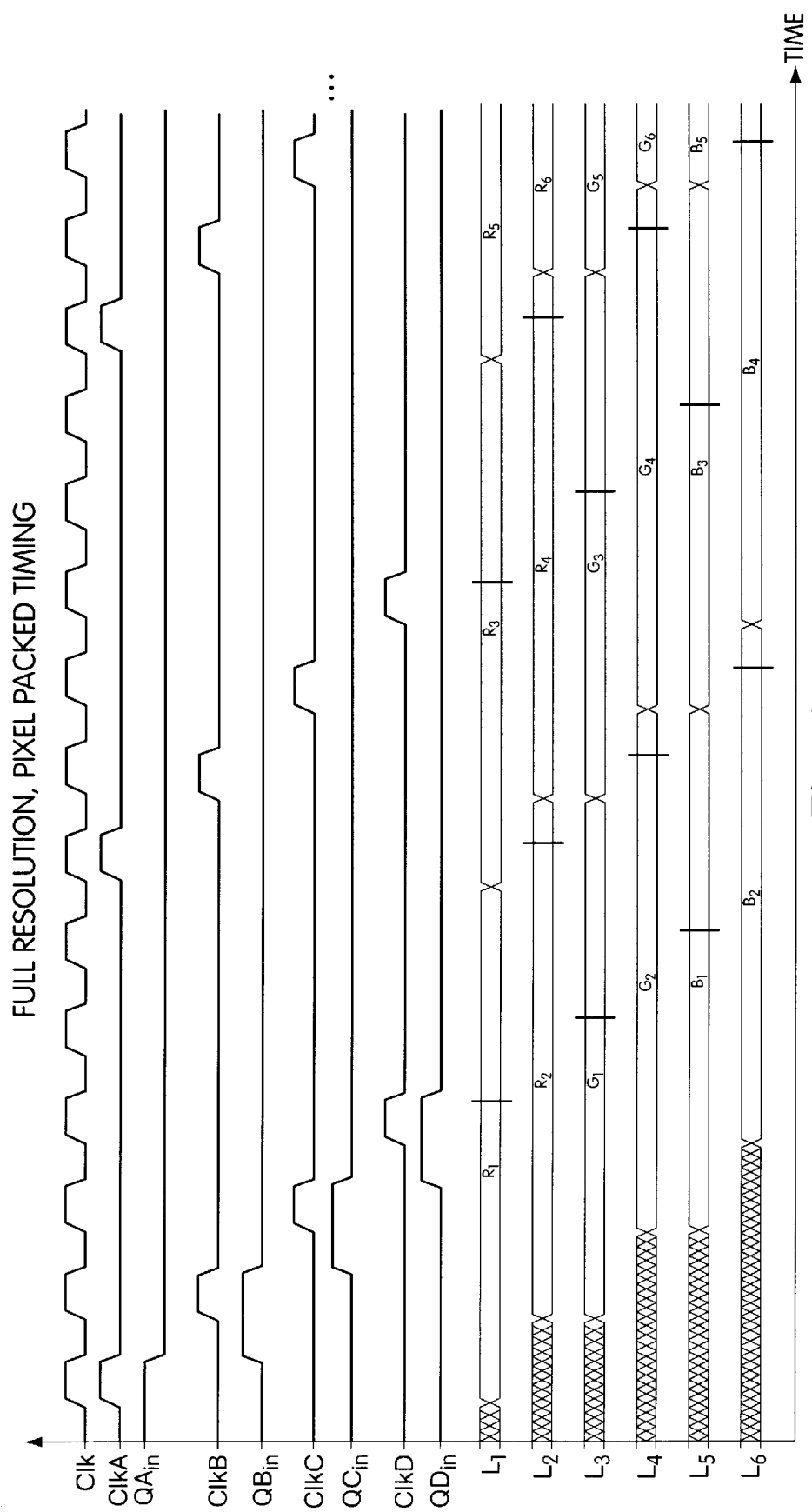

FIG. 9 shows examples of signals that may be generated by logic and timing circuit 102 and applied to control lines CLK, CLK[A ... D] and Q[A ... D]$_{in}$ of linear pixel array 104 (as configured in FIG. 7) in order to read out the contents of the pixels in pixel array 104 in a full-resolution, pixel-packed format.

The vertical lines passing through the curves representing the signals presented on each of array read out lines $L[_{1\ ...\ 6}]$ indicate times that the red, green and blue pixel contents provided on these readout lines may be sampled serially.

Multiplexer 106A may be controlled to select outputs of the differential-to-single-ended amplifiers 105 driven by signals on the array readout lines $L[_{1\ ...\ 6}]$ in the order $L_1$, $L_3$, $L_5$, $L_2$, $L_4$, $L_6$, $L_1$, $L_3$, $L_5$ ... $L_6$. In this manner, the single-ended signals produced in response the differential signals on these array readout lines may be provided at the output of multiplexer 106A at times corresponding to the locations of the vertical lines passing through the curves representing the signals on these readout lines. PGA 108A may amplify these single-ended signals, and ADC 110A may sample the output of PGA 108A at the times indicated by the vertical lines, thereby providing data (in pixel-packed format) at digital output DA representing the contents of each of the pixels in the array. Multiplexers 106B–C, PGAs 108B–C, and ADCs 110B–C are not employed when reading out the contents of pixels in pixel-packed format.

Figure 10:
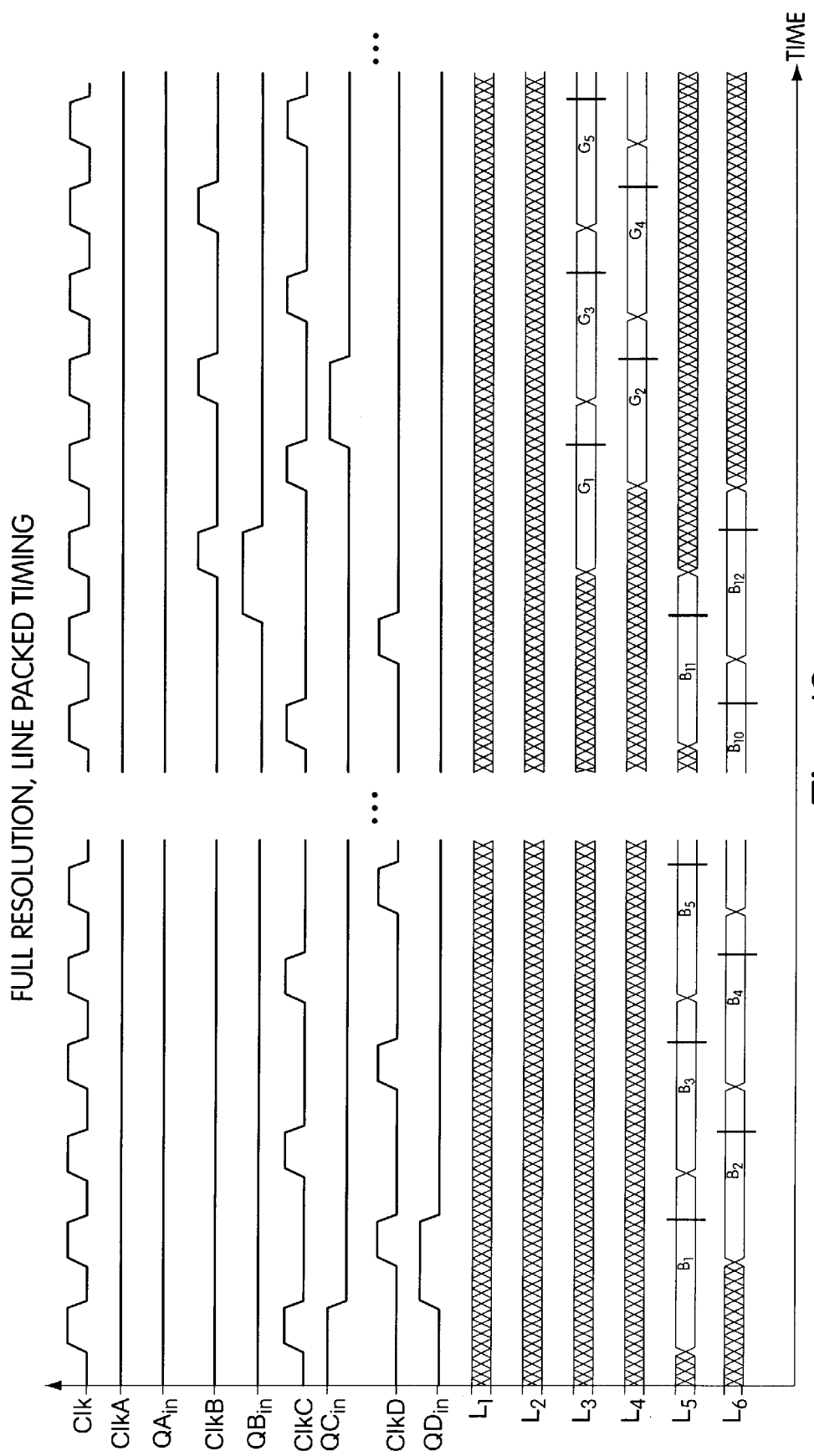

FIG. 10 shows examples of signals that may be generated by logic and timing circuit 102 and applied to control lines CLK, CLK[A ... D] and Q[A ... D]$_{in}$ of linear pixel array 104 (as configured in FIG. 7) in order to read out the contents of the pixels in pixel array 104 in full-resolution, line-packed format.

The vertical lines passing through the curves representing the signals presented on each of array read out lines $L[_{1\ ...\ 6}]$ indicate times that the red, green and blue pixel contents provided on these readout lines may be sampled serially.

Multiplexer 106A may be controlled to select outputs of the differential-to-single-ended amplifiers 105 that are driven by array readout lines $L[_{1\ ...\ 6}]$: (a) alternately between array readout lines $L_5$ and $L_6$ twelve times, then (b) alternately between array readout lines $L_3$ and $L_4$ twelve times, and finally (c) alternately between array readout lines $L_1$ and $L_2$ twelve times. In this manner, the single-ended signals produced in response to the differential signals on these array readout lines may be provided at the output of the multiplexer 106A at times corresponding to the locations of the vertical lines passing through the curves representing the signals on these readout lines. PGA 108A may amplify these single-ended signals, and ADC 110A may sample the output of PGA 108A at the times indicated by the vertical lines, thereby providing data (in line-packed format) at digital output DA representing the contents of each of the pixels in the array. Multiplexers 106B–C, PGAs 108B–C, and ADCs 110B–C are not employed when reading out the contents of pixels in line-packed format.

Figure 11:
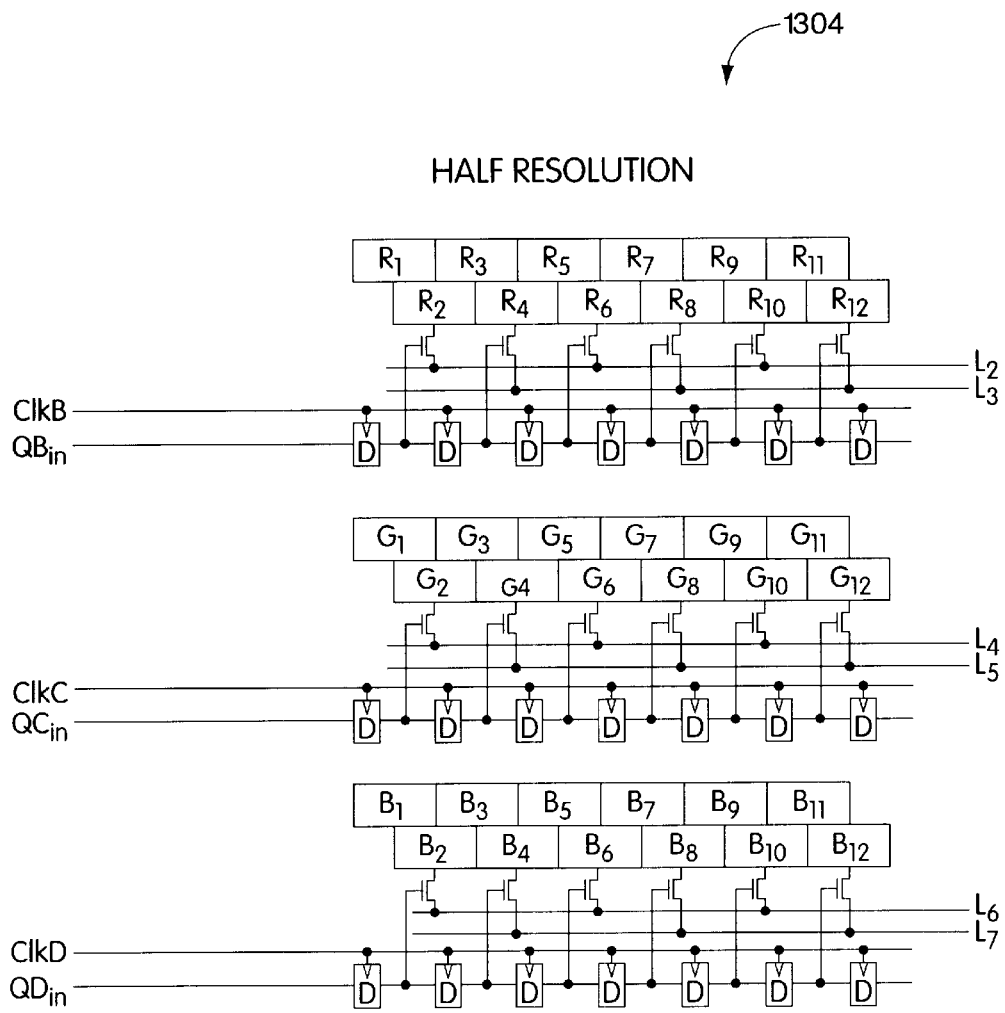
FIG. 11 is a partial schematic/partial block diagram illustrating how the circuit shown in FIG. 2 appears when configured to operate in half-resolution mode.

FIG. 11 shows linear pixel array 104 (FIG. 2) when configured in half-resolution mode. That is, FIG. 11 illustrates how linear circuit array 104 appears when the resolution-select signal on control line H is active and the resolution-select signals on control lines F and Q are inactive (the connections between the sources and drains of activated transistors being shown as short circuits).

When configured in half-resolution mode: (1) the contents of even-numbered red pixels are provided alternately on array readout lines $L_2$ and $L_3$, (2) the contents of the even-numbered green pixels are provided alternately on readout lines $L_4$ and $L_5$, and (3) the contents of the even-numbered blue pixels are provided alternately on array readout lines $L_6$ and $L_7$.

Figure 12:
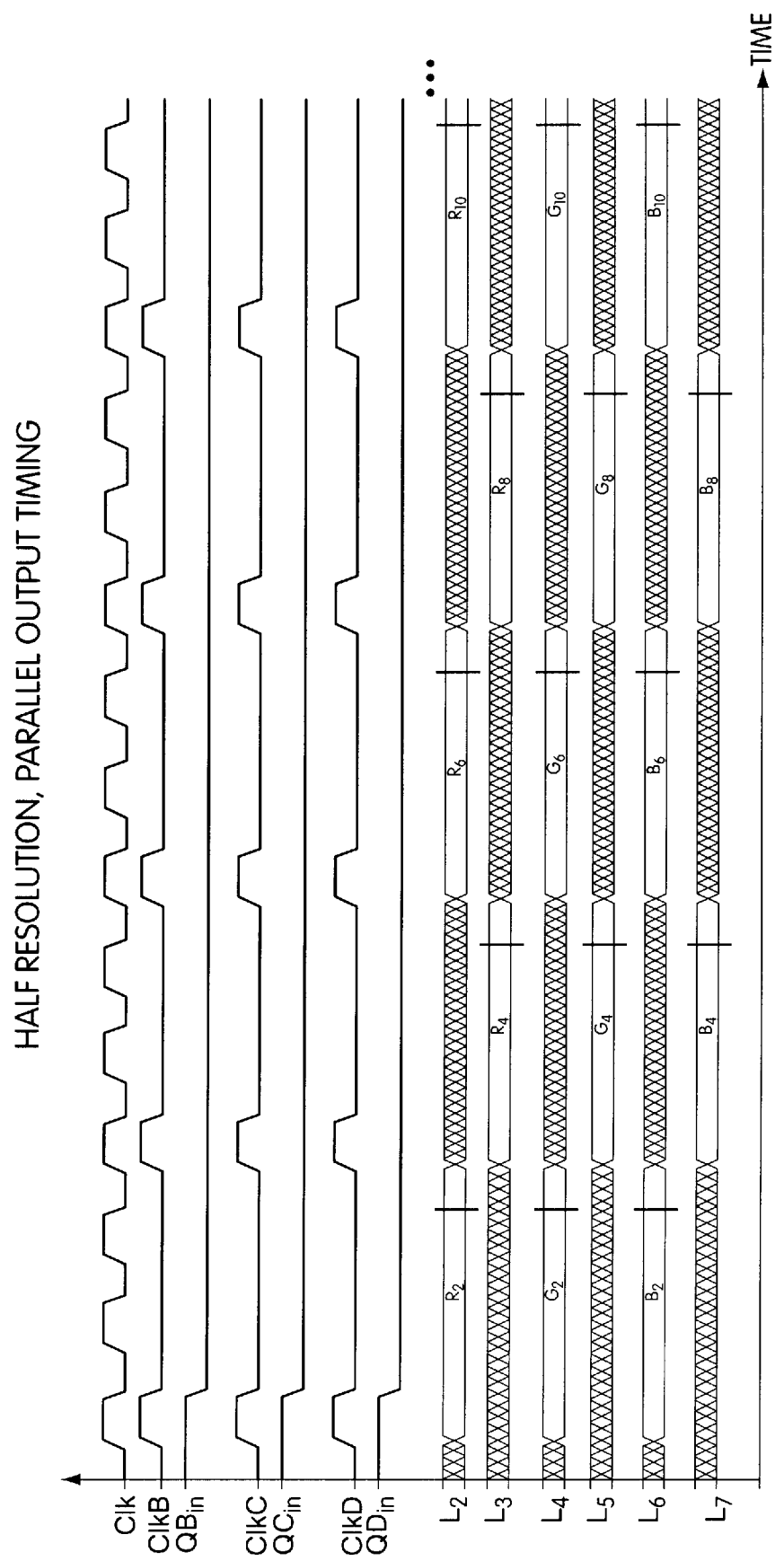
FIGS. 12–14 are timing diagrams illustrating examples of signals that may be used to operate the circuit shown in FIG. 11.

FIG. 12 shows examples of signals that may be generated by logic and timing circuit 102 and applied to control lines CLK, CLK[A . . . D] and Q[A . . . D]$_{in}$ of linear pixel array 104 (as configured in FIG. 11) in order to read out the contents of the pixels in pixel array 104 in half-resolution, parallel output format.

The vertical lines passing through the curves representing the signals presented on each of array read out lines $L[_{2 . . . 7}]$ indicate times that the red, green and blue pixel contents provided on these readout lines may be sampled in parallel.

Multiplexer 106A may be controlled to select alternately between outputs of the differential-to-single-ended amplifiers 105 that are driven by array readout lines $L_2$ and $L_3$. In this manner, the single-ended signals produced in response to the differential signals on array readout lines $L_2$ and $L_3$ may be provided at the output of multiplexer 106A at times corresponding to the locations of the vertical lines passing through the curves representing the signals on these readout lines. PGA 108A may amplify these single-ended signals, and ADC 110A may sample the output of PGA 108A at the times indicated by the vertical lines, thereby providing data at digital output DA representing the contents of each of even-numbered red pixels $R_2$–$R_{12}$.

Similarly, multiplexer 106B may be controlled to select alternately between outputs of the differential-to-single-ended amplifiers 105 that are driven by array readout lines $L_4$ and $L_5$. In this manner, the single-ended signals produced in response to the differential signals on array readout lines $L_4$ and $L_5$ may be provided at the output of multiplexer 106B at times corresponding to the locations of the vertical lines passing through the curves representing the signals on these readout lines. PGA 108B may amplify these single-ended signals, and ADC 110B may sample the output of PGA 108B at the times indicated by the vertical lines, thereby providing data at digital output DB representing the contents of each of even-numbered green pixels $G_2$–$G_{12}$.

Finally, multiplexer 106C may be controlled to select alternately between outputs of the differential-to-single-ended amplifiers 105 that are driven by array readout lines $L_6$ and $L_7$. In this manner, the single-ended signals produced in response to the differential signals on array readout lines $L_6$ and $L_7$ may be provided at the output of multiplexer 106C at times corresponding to the locations of the vertical lines passing through the curves representing the signals on these readout lines. PGA 108C may amplify these single-ended signals, and ADC 110C may sample the output of PGA 108C at the times indicated by the vertical lines, thereby providing data at digital output DC representing the contents of each of even-numbered blue pixels $B_2$–$B_{12}$.

Thus, when configured to operate in half-resolution, parallel output format, by properly controlling multiplexers 106A–C, system 100 provides digital signals at outputs DA, DB and DC in parallel, which signals represent the outputs of one-half of the red, green and blue pixels, respectively.

Figure 13:
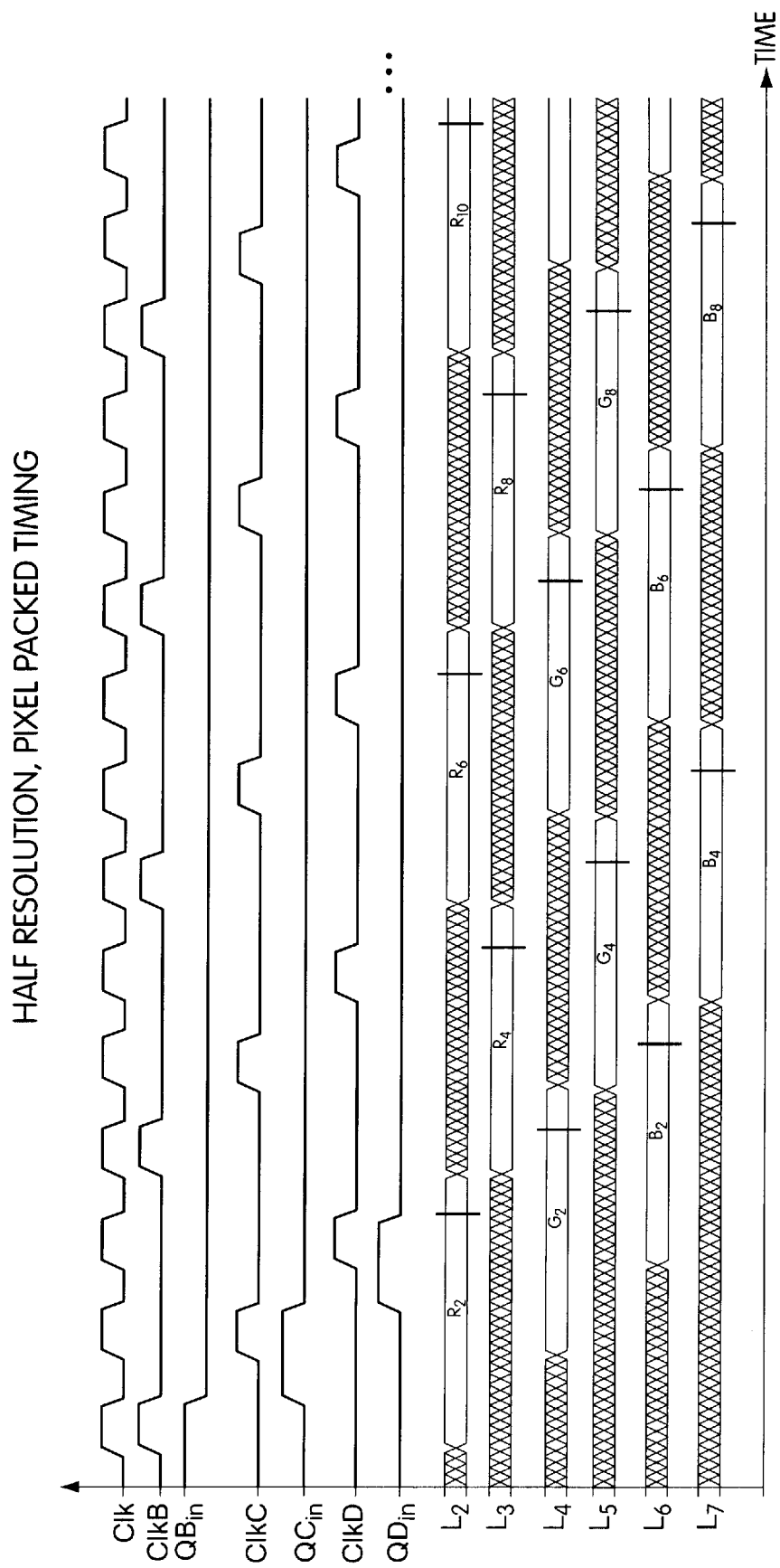

FIG. 13 shows examples of signals that may be generated by logic and timing circuit 102 and applied to control lines CLK, CLK[A . . . D] and Q[A . . . D]$_{in}$ of linear pixel array 104 (as configured in FIG. 11) in order to read out the contents of the pixels in pixel array 104 in half-resolution, pixel-packed format.

The vertical lines passing through the curves representing the signals presented on each of array read out lines $L[_{2 . . . 7}]$ indicate times that the red, green and blue pixel contents provided on these readout lines may be sampled serially.

Multiplexer 106A may be controlled to select outputs of the differential-to-single-ended amplifiers 105 driven by signals on array readout lines $L[_{2 . . . 7}]$ in the order: $L_2$, $L_4$, $L_6$, $L_3$, $L_5$, $L_7$, $L_2$, $L_4$. . . $L_7$. In this manner, the single-ended signals produced in response to the differential signals on these array readout lines may be provided at the output of multiplexer 106A at times corresponding to the locations of the vertical lines passing through the curves representing the signals on these readout lines. PGA 108A may amplify these single-ended signals, and ADC 110A may sample the output of PGA 108A at the times indicated by the vertical lines, thereby providing data (in pixel-packed format) at digital output DA representing the contents of one-half of the pixels in the array. Multiplexers 106B–C, PGAs 108B–C, and ADCs 110B–C are not employed when reading out the contents of pixels in pixel-packed format.

Figure 14:
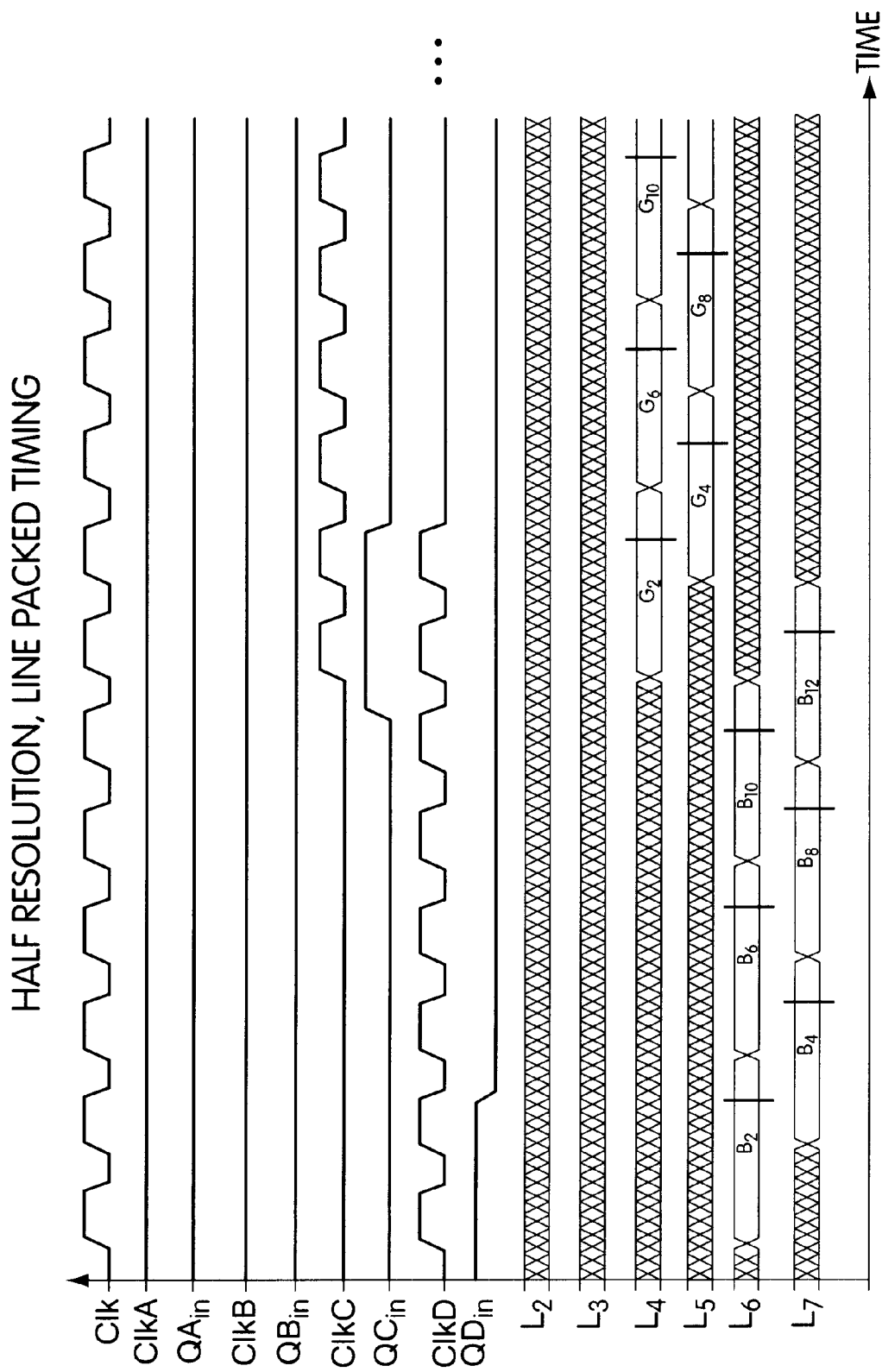

FIG. 14 shows examples of signals that may be generated by logic and timing circuit 102 and applied to control lines CLK, CLK[A . . . D] and Q[A . . . D]$_{in}$ of linear pixel array 104 (as configured in FIG. 11) in order to read out the contents of the pixels in pixel array 104 in half-resolution, line-packed format.

The vertical lines passing through the curves representing the signals presented on each of array read out lines $L[_{2 . . . 7}]$: indicate times that the red, green and blue pixel contents provided on these readout lines may be sampled serially.

Multiplexer 106A may be controlled to select outputs of the differential-to-single ended amplifiers 105 driven by signals on array readout lines $L[_{2 . . . 7}]$: (a) alternately between array readout lines $L_6$ and $L_7$ six times, then (b) alternately between array readout lines $L_4$ and $L_5$ six times, and finally (c) alternately between array readout lines $L_2$ and $L_3$ six times. In this manner, the single-ended signals produced in response to the differential signals on these array readout lines may be provided at the output of multiplexer 106B at times corresponding to the locations of the vertical lines passing through the curves representing the signals on these readout lines. PGA 108A may amplify these single-ended signals, and ADC 110A may sample the output of PGA 108A at the times indicated by the vertical lines, thereby providing data (in line-packed format) at digital output DA representing the contents of one-half of the pixels in the array. Multiplexers 106B–C, PGAs 108B–C, and ADCs 110B–C are not employed when reading out the contents of pixels in line-packed format.

Figure 15:
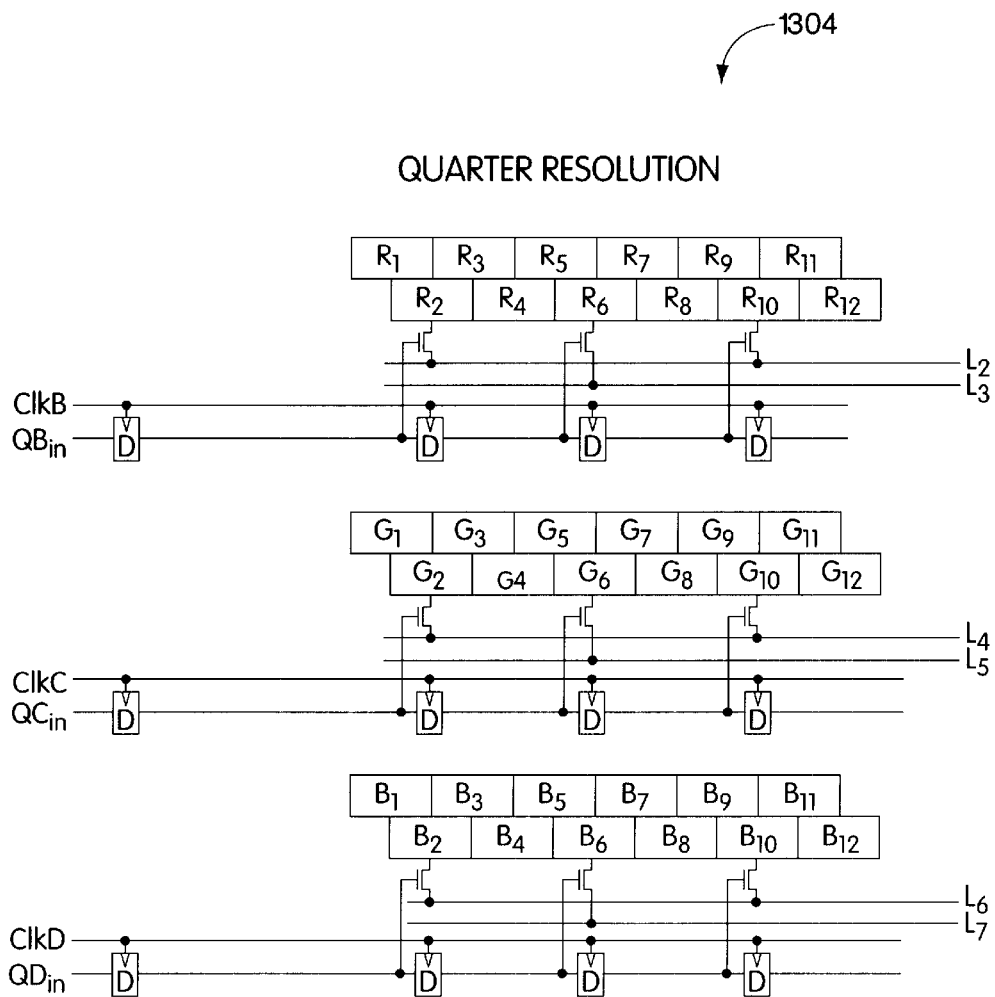
FIG. 15 is a partial schematic/partial block diagram illustrating how the circuit shown in FIG. 2 appears when configured to operate in quarter-resolution mode.

FIG. 15 shows linear pixel array 104 (FIG. 2) when configured in quarter-resolution mode. That is, FIG. 11 illustrates how linear circuit array 104 appears when the resolution-select signal on control line Q is active and the resolution-select signals on control lines F and H are inactive (the connections between the sources and drains of activated transistors being shown as short circuits).

When configured in quarter-resolution mode: (1) the contents of even-numbered red pixels are provided alternately on array readout lines $L_2$ and $L_3$, (2) the contents of the even-numbered green pixels are provided alternately on array readout line lines $L_4$ and $L_5$, and (3) the contents of the even-numbered blue pixels are provided alternately on array readout line lines $L_6$ and $L_7$.

Figure 16:
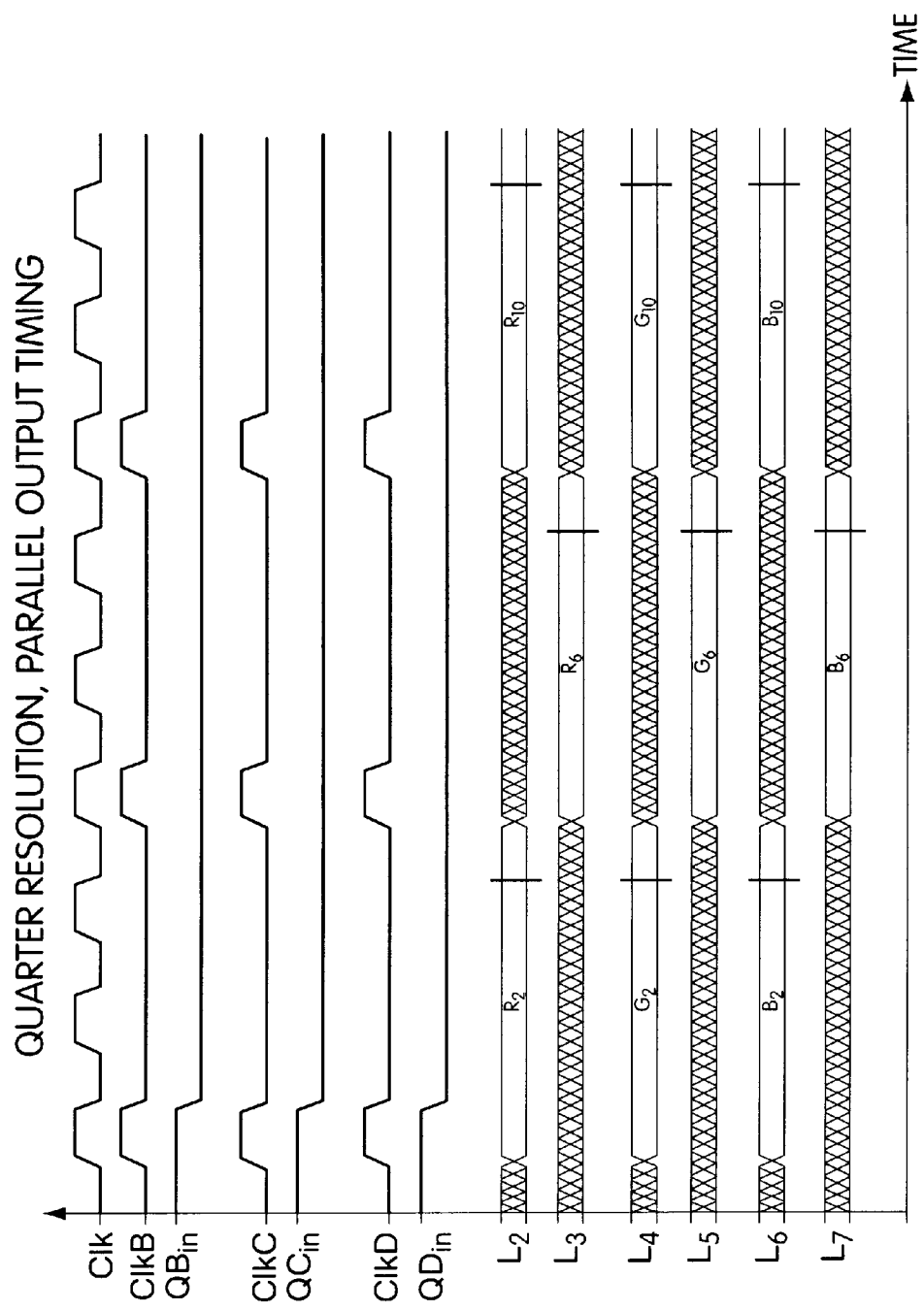
FIGS. 16–18 are timing diagram illustrating examples of signals that may be used to operate the circuit shown in FIG. 15.

FIG. 16 shows examples of signals that may be generated by logic and timing circuit 102 and applied to control lines CLK, CLK[A . . . D] and Q[A . . . D]$_{in}$ of linear pixel array 104 (as configured in FIG. 15) in order to read out the contents of the pixels in pixel array 104 in quarter-resolution, parallel output format.

The vertical lines passing through the curves representing the signals presented on each of array read out lines $L[_{2 . . . 7}]$ indicate times that the red, green and blue pixel contents provided on these readout lines may be sampled in parallel.

Multiplexer 106A may be controlled to select alternately between outputs of the differential-to-single-ended amplifiers 105 that are driven by array readout lines $L_2$ and $L_3$. In this manner, the single-ended signals produced in response to the differential signals on array readout lines $L_2$ and $L_3$ may be provided at the output of multiplexer 106A at times corresponding to the locations of the vertical lines passing through the curves representing the signals on these readout lines. PGA 108A may amplify these single-ended signals, and ADC 110A may sample the output of PGA 108A at the times indicated by the vertical lines, thereby providing data at digital output DA representing the contents of one-half of the even-numbered red pixels $R_2$–$R_{12}$.

Similarly, multiplexer 106B may be controlled to select alternately between outputs of the differential-to-single-ended amplifiers 105 that are driven by array readout lines $L_4$ and $L_5$. In this manner, the single-ended signals produced in response to the differential signals on array readout lines $L_4$ and $L_5$ may be provided at the output of multiplexer 106B at times corresponding to the locations of the vertical lines passing through the curves representing the signals on these readout lines. PGA 108B may amplify these single-ended signals, and ADC 110B may sample the output of PGA 108B at the times indicated by the vertical lines, thereby providing data at digital output DB representing the contents of one-half of even-numbered green pixels $G_2$–$G_{12}$.

Finally, multiplexer 106C may be controlled to select alternately between outputs of the differential-to-single-ended amplifiers 105 that are driven by array readout lines $L_6$ and $L_7$. In this manner, the single-ended signals produced in response to the differential signals on array readout lines $L_6$ and $L_7$ may be provided at the output of multiplexer 106C at times corresponding to the locations of the vertical lines passing through the curves representing the signals on these readout lines. PGA 108C may amplify these single-ended signals, and ADC 110C may sample the output of PGA 108C at the times indicated by the vertical lines, thereby providing data at digital output DC representing the contents of one-half of even-numbered blue pixels $B_2$–$B_{12}$.

Thus, when configured to operate in quarter-resolution, parallel output format, by properly controlling multiplexers 106A–C, system 100 provides digital signals at outputs DA, DB and DC in parallel, which signals represent the outputs of one-fourth of the red, green and blue pixels, respectively.

Figure 17:
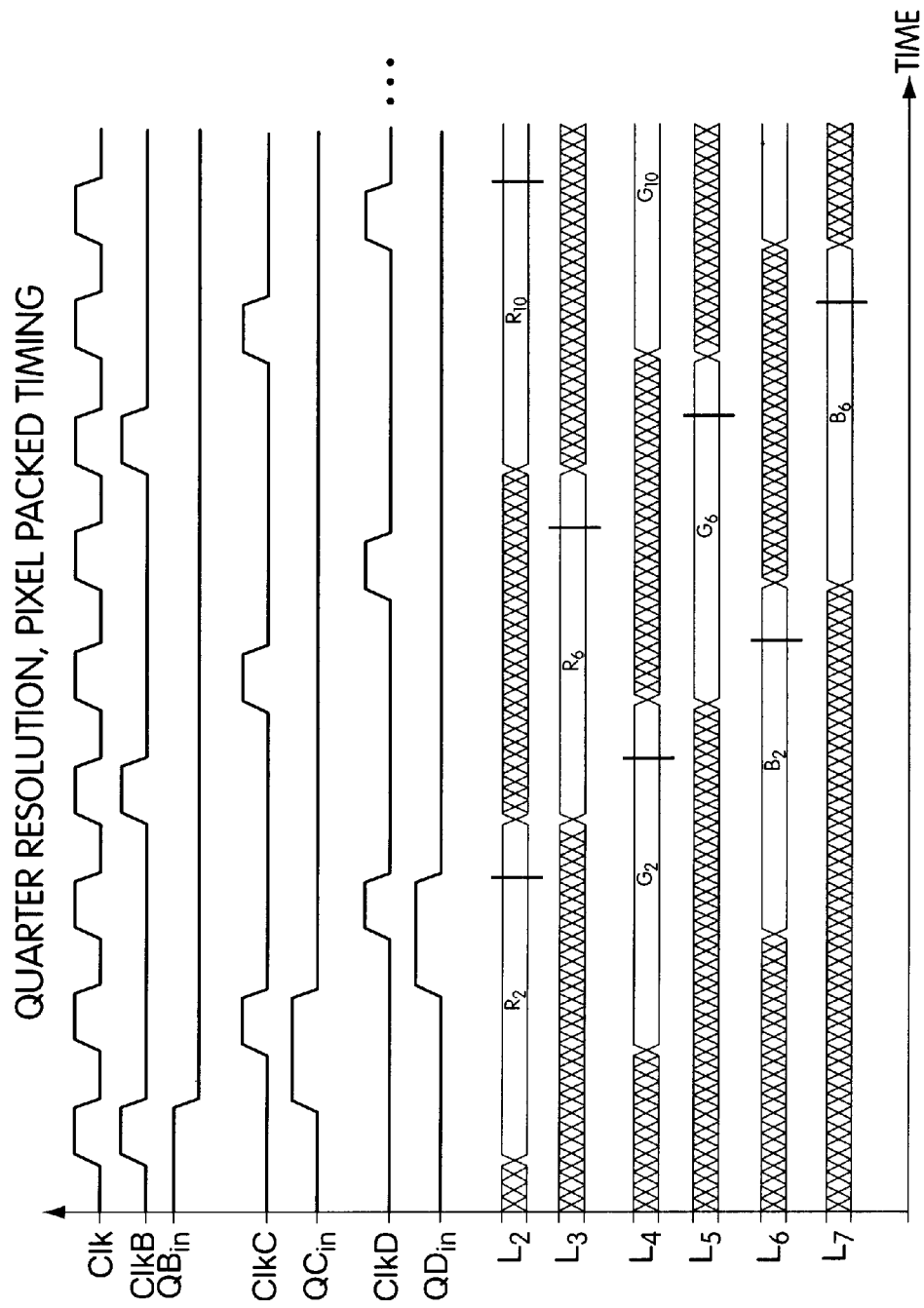

FIG. 17 shows examples of signals that may be generated by logic and timing circuit 102 and applied to control lines CLK, CLK[A . . . D] and Q[A . . . D]$_{in}$ of linear pixel array 104 (as configured in FIG. 15) in order to read out the contents of the pixels in pixel array 104 in quarter-resolution, pixel-packed format.

The vertical lines passing through the curves representing the signals presented on each of array read out lines $L[_{2 . . . 7}]$ indicate times that the red, green and blue pixel contents provided on these readout lines may be sampled serially.

Multiplexer 106A may be controlled to select outputs of the differential-to-single-ended amplifiers 105 driven by signals on the array readout lines $L[2_{2 . . . 7}]$ in the order: $L_2$, $L_4$, $L_6$, $L_3$, $L_5$, $L_7$, $L_2$, $L_4$. . . $L_7$. In this manner, the single-ended signals produced in response to the differential signals on these array readout lines may be provided at the output of multiplexer 106A at times corresponding to the locations of the vertical lines passing through the curves representing the signals on these readout lines. PGA 108A may amplify these single-ended signals, and ADC 110A may sample the output of PGA 108A at the times indicated by the vertical lines, thereby providing data (in pixel-packed format) at digital output DA representing the contents of one-fourth of the pixels in the array. Multiplexers 106B–C, PGAs 108B–C, and ADCs 110B–C are not employed when reading out the contents of pixels in pixel-packed format.

Figure 18:
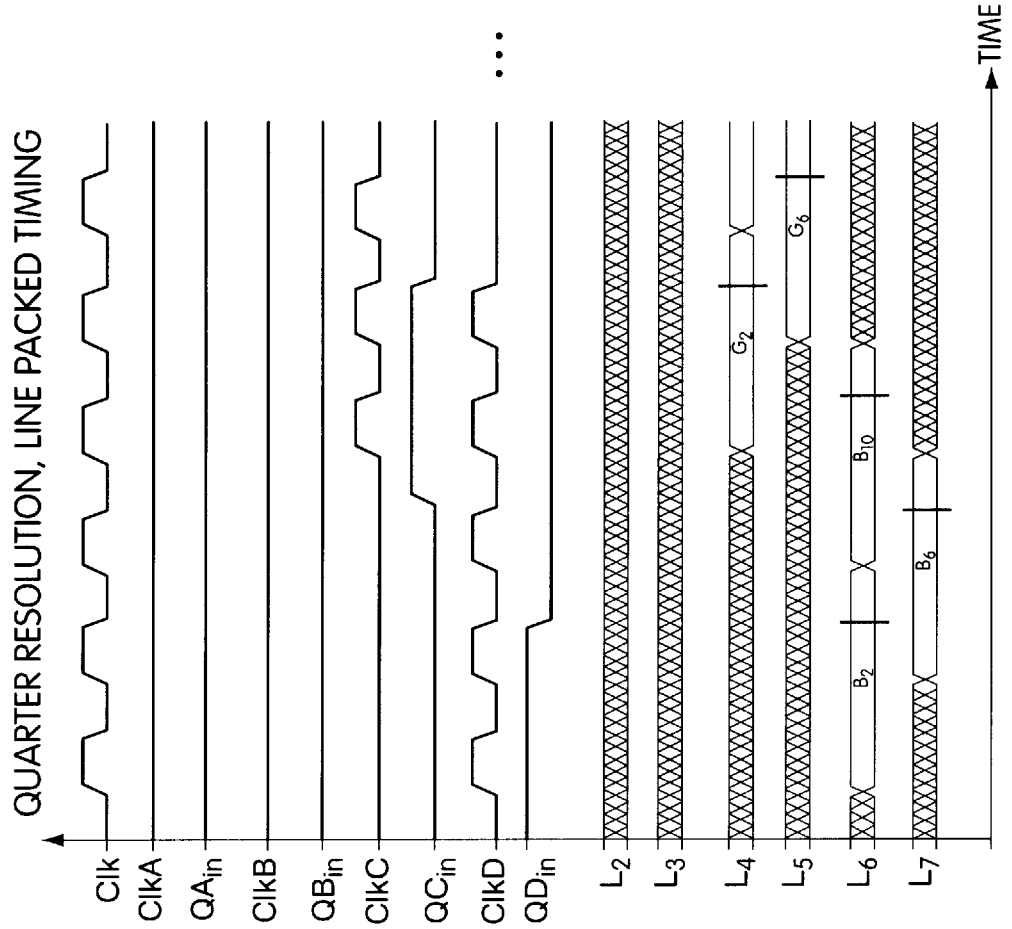

FIG. 18 shows examples of signals that may be generated by logic and timing circuit 102 and applied to control lines CLK, CLK[A . . . D] and Q[A . . . D]$_{in}$ of linear pixel array 104 (as configured in FIG. 15) in order to read out the contents of the pixels in pixel array 104 in quarter-resolution, line-packed format.

The vertical lines passing through the curves representing the signals presented on each of array read out lines $L[_{2 . . . 7}]$ indicate times that the red, green and blue pixel contents provided on these readout lines may be sampled serially.

Multiplexer 106A may be controlled to select outputs of the differential-to-single-ended amplifiers 105 driven by signals on the array readout lines $L[_{2 . . . 7}]$: (a) alternately between array readout lines $L_6$ and $L_7$ three times, then (b) alternately between array readout lines $L_4$ and $L_5$ three times, and finally (c) alternately between array readout lines $L_2$ and $L_3$ three times. In this manner, the single-ended signals produced in response to the differential signals on these array readout lines may be provided at the output of multiplexer 106A at times corresponding to the locations of the vertical lines passing through the curves representing the signals on these readout lines. PGA 108A may amplify these single-ended signals, and ADC 110A may sample the output of PGA 108A at the times indicated by the vertical lines, thereby providing data (in line-packed format) at digital output DA representing the contents of one-fourth of the pixels in the array. Multiplexers 106B–C, PGAs 108B–C, and ADCs 110B–C are not employed when reading out the contents of pixels in line-packed format.

It should be appreciated that, while particular a embodiment of a pixel and a particular technique for causing the pixels in an array to integrate charge have been described herein, alternative pixel embodiments and/or alternative techniques for causing the pixels to integrate charge in response to incident light may be employed without departing from the intended scope of the present invention. For example, while the pixels described herein are active pixel sensors, passive pixel sensors, i.e., pixels including no active devices (e.g., source-follower transistors), may alternatively be used.

Also, while a particular technique for selecting particular pixels in an array for readout has been described, alternative pixel-selection techniques may employed in connection with different embodiments of the present invention.

Further, while the outputs of the pixels have been described herein as being processed by double-sampling circuits prior to being supplied to array readout lines, the pixel outputs may alternatively be supplied to the array readout lines without being so processed. If desired, CDS processing may be performed on a different integrated circuit (IC) than the IC on which a circuit according to an embodiment of the invention is disposed.

Additionally, while selective connections between different elements has been shown and described herein as being performed by MOS transistors, any other devices that perform switch-like functions may alternatively be used.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. An image sensor, comprising:
   a plurality of array readout lines;
   at least one pixel, an output of the at least one pixel being selectively coupled to each of the array readout lines such that the contents of the at least one pixel may be provided to any one of the array readout lines without being provided to any other of the array readout lines; and
   means, responsive to at least one resolution-select signal and at least one pixel-select signal, for coupling the output of the at least one pixel to a particular one of the array readout lines.

2. An image sensor, comprising:
   a linear pixel array including a first group of pixels arranged in at least one first row, and a second group of pixels arranged in at least one second row;
   an array readout line;
   a first group of pixel select switches that comprises a separate pixel select switch for each pixel included in the first group of pixels, and a first group of line select switches that comprises a separate line select switch for each pixel select switch included in the first group of pixel select switches, each of the pixel select switches included in the first group of pixel select switches being coupled between a respective pixel included in the first group of pixels and a corresponding line select switch included in the first group of line select switches, and each of the line select switches included in the first group of line select switches being coupled between a respective pixel select switch included in the first group of pixel select switches and the array readout line so that contents of the pixels included in the first group of pixels can be selectively provided to the array readout line via the corresponding pixel select switches included in the first group of pixel select switches and the corresponding line select switches included in the first group of line select switches; and
   a second group of pixel select switches that comprises a separate pixel select switch for each pixel included in the second group of pixels, and a second group of line select switches that comprises a separate line select switch for each pixel select switch included in the second group of pixel select switches, each of the pixel select switches included in the second group of pixel select switches being coupled between a respective pixel included in the second group of pixels and a corresponding line select switch included in the second group of line select switches, and each of the line select switches included in the second group of line select switches being coupled between a respective pixel select switch included in the second group of pixel select switches and the array readout line so that contents of the pixels included in the second group of pixels can be selectively provided to the array readout line via the corresponding pixel select switches included in the second group of pixel select switches and the corresponding line select switches included in the second group of line select switches.

3. The image sensor as claimed in claim 2, further comprising first means, responsive to at least one resolution-select signal and at least one pixel-select signal, for controlling the first and second groups of line select switches and the first and second groups of pixel select switches to couple the array readout line to a selected one of:
   the outputs of the pixels included in the first group of pixels, and
   the outputs of the pixels included in the second group of pixels.

4. The image sensor as claimed in claim 3, further comprising second means for controlling the first means for controlling to control an order in which the outputs of the pixels included in the selected one of the first and second groups of pixels are coupled to the array readout line.

5. The image sensor as claimed in claim 4, further comprising means, responsive to the at least one resolution-select signal, for adjusting the second means for controlling to cause the second means for controlling to couple only particular ones of the outputs of the pixels included in the selected one of the first and second groups of pixels to the array readout line.

6. The image sensor of claim 2, wherein the pixels included in the first group of pixels are sensitive to a first color of light and the pixels included in the second group of pixels are sensitive to a second color of light.

7. The image sensor of claim 6, wherein the pixels included in the first group of pixels are arranged in a single first row, and the pixels included in the second group of pixels are arranged in a single second row.

8. The image sensor of claim 2, wherein the pixels included in the first group of pixels are arranged in a single first row, and the pixels included in the second group of pixels are arranged in a single second row.

9. The image sensor of claim 2, wherein at least some of the pixels included in the first group of pixels are included in the same row as and interleaved amongst additional pixels that are not included in the first group of pixels.

10. The image sensor of any one of claims 2–9, wherein:
    control inputs of the line select switches included in the first group of line select switches are interconnected; and
    control inputs of the line select switches included in the second group of line select switches are interconnected.

11. The image sensor of any one of claims 2–9, further comprising:
    a second array readout line; and
    a third group of line select switches that comprises a separate line select switch for each pixel select switch included in the first group of pixel select switches, each line select switch included in the third group of line select switches being coupled between a respective pixel select switch included in the first group of pixel select switches and the second array readout line so that contents of the pixels included in the first group of pixels can be selectively provided to the second array readout line via the corresponding pixel select switches included in the first group of pixel select switches and the corresponding line select switches included in the third group of line select switches.

12. The image sensor of any one of claims 2–9, further comprising:
a second array readout line; and
a third group of line select switches that comprises a separate line select switch for each pixel select switch included in the first group of pixel select switches, each line select switch included in the third group of line select switches being coupled between a respective pixel select switch included in the first group of pixel select switches and the second array readout line so that contents of the pixels included in the first group of pixels can be selectively provided to the second array readout line via the corresponding pixel select switches included in the first group of pixel select switches and the corresponding line select switches included in the third group of line select switches; and wherein:
control inputs of the line select switches included in the first group of line select switches are interconnected;
control inputs of the line select switches included in the second group of line select switches are interconnected; and
control inputs of the line select switches included in the third group of line select switches are interconnected.

13. The image sensor as claimed in claim 2, further comprising at least one controller configured to, responsive to at least one resolution-select signal and at least one pixel-select signal, control the first and second groups of line select switches and the first and second groups of pixel select switches to couple the array readout line to a selected one of:
the outputs of the pixels included in the first group of pixels, and
the outputs of the pixels included in the second group of pixels.

14. The image sensor as claimed in claim 13, wherein the at least one controller is further configured to control an order in which the outputs of the pixels included in the selected one of the first and second groups of pixels are coupled to the array readout line.

15. The image sensor as claimed in claim 14, wherein the at least one controller is further configured to, responsive to the at least one resolution-select signal, cause only particular ones of the outputs of the pixels included in the selected one of the first and second groups of pixels to be coupled to the array readout line.

16. An image sensor, comprising:
a linear pixel array including a plurality of pixels arranged in at least one first row;
first and second array readout lines;
a plurality of pixel select switches that comprises a separate pixel select switch for each of the plurality of pixels;
a first group of line select switches that comprises a separate line select switch for each pixel select switch included in the plurality of pixel select switches, each of the pixel select switches included in the plurality of pixel select switches being coupled between a respective pixel included in the plurality of pixels and a corresponding line select switch included in the first group of line select switches, and each of the line select switches included in the first group of line select switches being coupled between a respective pixel select switch included in the plurality of pixel select switches and the first array readout line so that contents of the pixels included in the plurality of pixels can be selectively provided to the first array readout line via the corresponding pixel select switches included in the plurality of pixel select switches and the corresponding line select switches included in the first group of line select switches; and
a second group of line select switches that comprises a separate line select switch for each pixel select switch included in the plurality of pixel select switches, each of the pixel select switches included in the plurality of pixel select switches being coupled between a respective pixel included in the plurality of pixels and a corresponding line select switch included in the second group of line select switches, and each of the line select switches included in the second group of line select switches being coupled between a respective pixel select switch included in the plurality of pixel select switches and the second array readout line so that contents of the pixels included in the plurality of pixels can be selectively provided to the second array readout line via the corresponding pixel select switches included in the plurality of pixel select switches and the corresponding line select switches included in the second group of line select switches.

17. The image sensor of claim 16, wherein the pixels included in the plurality of pixels are arranged in a single first row.

18. The image sensor of claim 17, wherein the pixels included in the plurality of pixels are sensitive to a particular color of light.

19. The image sensor of claim 16, wherein the pixels included in the plurality of pixels are sensitive to a particular color of light.

20. The image sensor of claim 16, wherein at least some of the pixels included in the plurality of pixels are included in the same row as and interleaved amongst additional pixels that are not included in the plurality of pixels.

21. The image sensor of any one of claims 16–20, wherein:
control inputs of the line select switches included in the first group of line select switches are interconnected; and
control inputs of the line select switches included in the second group of line select switches are interconnected.

22. The image sensor of claim 16, further comprising first means, responsive to at least one resolution-select signal and at least one pixel-select signal, for controlling the first and second groups of line select switches and the first and second groups of pixel select switches to couple outputs of the plurality of pixels to a selected one of the first array readout line and the second array readout line.

23. The image sensor of claim 22, further comprising second means for controlling the first means for controlling to control an order in which the outputs of the pixels included in the plurality of pixels are coupled to the selected one of the first array readout line and the second array readout line.

24. The image sensor of claim 22, further comprising means, responsive to the at least one resolution-select signal, for adjusting the second means for controlling to cause the second means for controlling to couple only particular ones of the outputs of the pixels included in the plurality of pixels to the selected one of the first array readout line and the second array readout line.

25. The image sensor of claim 16, further comprising at least one controller configured to, responsive to at least one resolution-select signal and at least one pixel-select signal, control the first and second groups of line select switches and the first and second groups of pixel select switches to couple outputs of the plurality of pixels to a selected one of the first array readout line and the second array readout line.

26. The image sensor of claim 25, wherein the at least one controller is further configured to control an order in which the outputs of the pixels included in the plurality of pixels are coupled to the selected one of the first array readout line and the second array readout line.

27. The image sensor of claim 26, wherein the at least one controller is further configured to, responsive to the at least one resolution-select signal, cause only particular ones of the outputs of the pixels included in the plurality of pixels to be coupled to the selected one of the first array readout line and the second array readout line.

* * * * *